US010671038B2

(12) United States Patent
Jundt et al.

(10) Patent No.: US 10,671,038 B2
(45) Date of Patent: Jun. 2, 2020

(54) ARCHITECTURE-INDEPENDENT PROCESS CONTROL

(71) Applicant: FISHER-ROSEMOUNT SYSTEMS, INC., Round Rock, TX (US)

(72) Inventors: Larry Oscar Jundt, Round Rock, TX (US); Gary Law, Georgetown, TX (US); Edward McDevitt, Olathe, KS (US); Matt Stoner, Blue Springs, MO (US); Godfrey R. Sherriff, Austin, TX (US); David R. Denison, Austin, TX (US); Mark J. Nixon, Round Rock, TX (US); James R. Balentine, Austin, TX (US); J. Michael Lucas, Leicester (GB); Stephen Gilbert, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 341 days.

(21) Appl. No.: 15/211,846

(22) Filed: Jul. 15, 2016

(65) Prior Publication Data
US 2018/0017952 A1 Jan. 18, 2018

(51) Int. Cl.
*G05B 19/042* (2006.01)
*H04L 12/46* (2006.01)
(Continued)

(52) U.S. Cl.
CPC ......... *G05B 19/0423* (2013.01); *G05B 15/02* (2013.01); *G05B 19/4185* (2013.01);
(Continued)

(58) Field of Classification Search
CPC ............... Y02P 90/18; G05B 19/0426; G05B 2219/23248; G05B 2219/23261;
(Continued)

(56) References Cited

U.S. PATENT DOCUMENTS 4,885,684 A 12/1989 Austin et al.
5,050,088 A 9/1991 Buckler et al.
(Continued)

FOREIGN PATENT DOCUMENTS

EP 1 691 245 A1 8/2006
GB 2 351 371 A 12/2000
(Continued)

OTHER PUBLICATIONS

European Patent Office, "Communication pursuant to Article 94(3) EPC", issued in connection with European patent application No. 10154029.2-1807, dated Sep. 24, 2014, 9 pages.
(Continued)

*Primary Examiner* — Darrin D Dunn
(74) *Attorney, Agent, or Firm* — Marshall, Gerstein & Borun LLP

(57) ABSTRACT

Process control systems for operating process plants are disclosed herein. The process control systems include control modules that are decoupled from the I/O architecture of the process plants using signal objects or generic shadow blocks. This decoupling is effected by using the signal objects or generic shadow blocks to manage at least part of the communication between the control modules and the field devices. Signal objects may convert between protocols used by control modules and field devices, thus decoupling the control modules from the I/O architecture. Generic shadow blocks may be automatically configured to mimic the operation of field devices within a controller executing the control modules, thus partially decoupling the control modules from the I/O architecture by using the shadow blocks to manage communication between the control modules and the field devices.

37 Claims, 8 Drawing Sheets

(51) Int. Cl.
*H04L 12/00* (2006.01)
*G05B 19/418* (2006.01)
*G05B 15/02* (2006.01)

(52) U.S. Cl.
CPC .......... *H04L 12/00* (2013.01); *H04L 12/4625* (2013.01); *G05B 2219/1208* (2013.01); *G05B 2219/31246* (2013.01); *G05B 2219/31369* (2013.01); *Y02P 90/18* (2015.11); *Y02P 90/86* (2015.11)

(58) Field of Classification Search
CPC .......... G05B 2219/25067; G05B 2219/25232; G05B 2219/31121; G05B 2219/31422; G05B 2219/31472; G05B 2219/32128
See application file for complete search history.

(56) References Cited

U.S. PATENT DOCUMENTS

| | | | |
|---|---|---|---|
| 5,390,314 A | 2/1995 | Swanson | |
| 5,410,701 A | 4/1995 | Gopalraman | |
| 5,428,525 A | 6/1995 | Cappelaere et al. | |
| 5,790,863 A | 8/1998 | Simonyi | |
| 5,801,942 A | 9/1998 | Nixon et al. | |
| 5,828,851 A * | 10/1998 | Nixon ................ | G05B 19/0421 710/105 |
| 5,859,847 A | 1/1999 | Dew et al. | |
| 5,909,368 A | 6/1999 | Nixon et al. | |
| 5,963,450 A | 10/1999 | Dew | |
| 6,098,116 A * | 8/2000 | Nixon ................ | G05B 19/0426 709/220 |
| 6,195,591 B1 * | 2/2001 | Nixon ................ | G05B 19/0421 700/19 |
| 6,256,635 B1 | 7/2001 | Arrouye et al. | |
| 6,298,454 B1 | 10/2001 | Schleiss et al. | |
| 6,330,517 B1 | 12/2001 | Dobrowski et al. | |
| 6,385,496 B1 | 5/2002 | Irwin et al. | |
| 6,446,202 B1 * | 9/2002 | Krivoshein ........ | G05B 19/0421 700/1 |
| 6,510,351 B1 | 1/2003 | Blevins et al. | |
| 6,618,630 B1 | 9/2003 | Jundt et al. | |
| 6,738,388 B1 | 5/2004 | Stevenson et al. | |
| 6,772,204 B1 | 8/2004 | Hansen | |
| 6,948,159 B2 | 9/2005 | Born et al. | |
| 7,043,311 B2 * | 5/2006 | Nixon ................ | G05B 19/4188 700/28 |
| 7,110,835 B2 | 9/2006 | Blevins et al. | |
| 7,117,052 B2 | 10/2006 | Lucas et al. | |
| 7,146,230 B2 | 12/2006 | Glanzer et al. | |
| 7,178,103 B2 | 2/2007 | Humphrey et al. | |
| 7,213,478 B2 | 5/2007 | Harada et al. | |
| 7,251,534 B2 | 7/2007 | Walls et al. | |
| 7,257,523 B1 * | 8/2007 | Nixon ................... | G05B 17/02 700/2 |
| 7,289,861 B2 | 10/2007 | Aneweer et al. | |
| 7,317,952 B2 | 1/2008 | Bhandiwad et al. | |
| 7,401,086 B2 | 7/2008 | Chorafakis et al. | |
| 7,561,930 B2 | 7/2009 | Sokolova et al. | |
| 7,676,786 B2 | 3/2010 | Shenfield et al. | |
| 7,707,563 B2 | 4/2010 | Wei | |
| 7,783,370 B2 * | 8/2010 | Nixon ................... | G06F 9/4488 700/83 |
| 7,848,829 B2 | 12/2010 | Nixon et al. | |
| 8,407,716 B2 | 3/2013 | Nixon et al. | |
| 8,479,109 B2 * | 7/2013 | Washington ............. | G06F 8/34 715/763 |
| 8,806,456 B2 | 8/2014 | Gazzillo et al. | |
| 8,896,603 B2 | 11/2014 | Hammack et al. | |
| 9,354,629 B2 | 5/2016 | Balentine et al. | |
| 9,417,626 B2 * | 8/2016 | Jones ................ | G05B 19/0426 |
| 2002/0041289 A1 | 4/2002 | Hatch et al. | |
| 2002/0059467 A1 | 5/2002 | Rapp et al. | |
| 2002/0077711 A1 * | 6/2002 | Nixon ................ | C10G 11/187 700/51 |
| 2002/0083036 A1 * | 6/2002 | Price .................. | G06F 11/2028 |
| 2003/0048287 A1 | 3/2003 | Little et al. | |
| 2003/0051053 A1 * | 3/2003 | Vasko ................ | G05B 19/4185 709/246 |
| 2003/0135508 A1 | 7/2003 | Chorafakis et al. | |
| 2003/0208587 A1 | 11/2003 | Sauer | |
| 2003/0236577 A1 * | 12/2003 | Clinton .................... | G06F 8/51 700/10 |
| 2003/0236676 A1 | 12/2003 | Graham | |
| 2004/0059851 A1 | 3/2004 | Donaires | |
| 2004/0098139 A1 * | 5/2004 | Fehrer ..................... | H04L 12/40 700/1 |
| 2004/0117775 A1 | 6/2004 | Born et al. | |
| 2004/0123091 A1 | 6/2004 | Das | |
| 2004/0199925 A1 * | 10/2004 | Nixon ................ | G05B 19/4188 719/315 |
| 2004/0213285 A1 * | 10/2004 | Stevenson .......... | G05B 19/4185 370/465 |
| 2004/0225491 A1 | 11/2004 | Chang | |
| 2004/0230327 A1 | 11/2004 | Opheim et al. | |
| 2004/0230582 A1 | 11/2004 | Pagnano et al. | |
| 2004/0230899 A1 | 11/2004 | Pagnano et al. | |
| 2004/0243933 A1 | 12/2004 | Becker et al. | |
| 2005/0012608 A1 * | 1/2005 | Havekost ........... | G05B 23/0272 340/517 |
| 2005/0015176 A1 | 1/2005 | Harada et al. | |
| 2005/0055681 A1 | 3/2005 | Gadre | |
| 2005/0071522 A1 | 3/2005 | DeGroot | |
| 2005/0071851 A1 | 3/2005 | Opheim | |
| 2005/0096872 A1 | 5/2005 | Blevins et al. | |
| 2005/0149478 A1 | 7/2005 | Fahy | |
| 2005/0172220 A1 | 8/2005 | Humphrey et al. | |
| 2006/0074499 A1 | 4/2006 | Hamidpour | |
| 2006/0095918 A1 | 5/2006 | Hirose | |
| 2006/0111794 A1 | 5/2006 | Wysuph et al. | |
| 2006/0190112 A1 | 8/2006 | Buesgen et al. | |
| 2007/0005805 A1 | 1/2007 | Drath et al. | |
| 2007/0006188 A1 | 1/2007 | Schroth et al. | |
| 2007/0016896 A1 | 1/2007 | Wittmer et al. | |
| 2007/0038975 A1 | 2/2007 | Lennon et al. | |
| 2007/0067725 A1 | 3/2007 | Cahill et al. | |
| 2007/0075916 A1 | 4/2007 | Bump et al. | |
| 2007/0078540 A1 | 4/2007 | Bump et al. | |
| 2007/0106761 A1 | 5/2007 | Beoughter et al. | |
| 2007/0139441 A1 | 6/2007 | Lucas et al. | |
| 2007/0157183 A1 | 7/2007 | Pazel et al. | |
| 2007/0165031 A1 | 7/2007 | Gilbert et al. | |
| 2007/0174225 A1 * | 7/2007 | Blevins .................. | G06F 9/4488 340/3.9 |
| 2007/0179645 A1 | 8/2007 | Nixon et al. | |
| 2007/0240069 A1 * | 10/2007 | Eldridge ............ | G05B 19/0426 715/763 |
| 2007/0244583 A1 | 10/2007 | Rachut | |
| 2007/0255520 A1 | 11/2007 | Becker et al. | |
| 2007/0282463 A1 | 12/2007 | Hodson et al. | |
| 2008/0058969 A1 | 3/2008 | Nixon et al. | |
| 2008/0080395 A1 * | 4/2008 | Law .................... | G05B 19/4186 370/254 |
| 2008/0112388 A1 | 5/2008 | Garrett et al. | |
| 2008/0168356 A1 * | 7/2008 | Eryurek ............. | G05B 23/0272 715/736 |
| 2008/0189441 A1 * | 8/2008 | Jundt .................... | G05B 19/042 710/3 |
| 2008/0234837 A1 | 9/2008 | Samudrala et al. | |
| 2008/0276230 A1 | 11/2008 | Chang et al. | |
| 2008/0320402 A1 * | 12/2008 | Isenmann .......... | G05B 19/4083 715/762 |
| 2009/0077539 A1 | 3/2009 | Booth | |
| 2009/0164985 A1 | 6/2009 | Balko et al. | |
| 2009/0183139 A1 | 7/2009 | Foti et al. | |
| 2009/0204458 A1 | 8/2009 | Wiese et al. | |
| 2009/0271006 A1 * | 10/2009 | Jordan ............... | G05B 19/0428 700/20 |
| 2009/0271726 A1 | 10/2009 | Gavimath et al. | |
| 2009/0276486 A1 | 11/2009 | Tandon et al. | |
| 2009/0292996 A1 | 11/2009 | Anne et al. | |
| 2009/0306964 A1 | 12/2009 | Bonnet et al. | |
| 2010/0121999 A1 | 5/2010 | Isenmann et al. | |

(56) References Cited

U.S. PATENT DOCUMENTS

| | | | |
|---|---|---|---|
| 2010/0145476 | A1 | 6/2010 | Junk et al. |
| 2010/0222899 | A1* | 9/2010 | Blevins ................ G05B 17/02 700/80 |
| 2011/0046792 | A1 | 2/2011 | Imes et al. |
| 2011/0072382 | A1 | 3/2011 | Caldwell et al. |
| 2011/0230980 | A1* | 9/2011 | Hammack ........... G05B 19/409 700/17 |
| 2011/0288846 | A1* | 11/2011 | Kihas .................... G05B 17/02 703/13 |
| 2012/0041570 | A1* | 2/2012 | Jones ................ G05B 19/0426 700/17 |
| 2014/0100669 | A1* | 4/2014 | Hammack ............ G06F 3/0484 700/17 |
| 2014/0100676 | A1* | 4/2014 | Scott .................... G06F 3/0484 700/83 |
| 2014/0277604 | A1* | 9/2014 | Nixon ................ G05B 19/4185 700/47 |
| 2014/0278312 | A1 | 9/2014 | Nixon et al. |
| 2015/0193106 | A1 | 7/2015 | Mann et al. |
| 2015/0193418 | A1 | 7/2015 | Koska et al. |
| 2015/0316918 | A1* | 11/2015 | Schleiss ................ G05B 15/02 700/83 |
| 2015/0378694 | A1 | 12/2015 | Lagergren et al. |

FOREIGN PATENT DOCUMENTS

| | | |
|---|---|---|
| GB | 2 356 266 A | 5/2001 |
| JP | H06-318105 A | 11/1994 |
| JP | H08-129483 A | 5/1996 |
| JP | 2001-337706 A | 12/2001 |
| JP | 2003-108220 A | 4/2003 |
| JP | 2008-140410 A | 6/2008 |
| WO | WO-2005/109122 A1 | 11/2005 |
| WO | WO-2011/029887 A2 | 3/2011 |

OTHER PUBLICATIONS

European Patent Office, "European Search Report," issued in connection with European application serial No. 10154029.2, dated Oct. 6, 2011, 6 pages.
European Patent Office, "Examination Report", issued in connection with corresponding European Patent Application No. 10154029.2 dated Jan. 27, 2014 (5 pages).
European Patent Office, "Summons to Attend Oral Proceedings Pursuant to Rule 115(1) EPC," issued in connection to European Patent Application No. 10154029.2, mailed May 27, 2015 (8 pages).
Intellectual Property Office of Great Britain, "Examination Report under Section 18(3)", issued in connection with Great Britain patent application No. GB1002596.3, mailed on Mar. 31, 2014, 4 pages.
Japan Intellectual Property Office, "Office Action," issued in connection with JP Application No. 2010-032263, dated Oct. 29, 2013, 2 pages.
Japan Patent Office, "Notice of Reasons for Rejection," issued in connection with Japanese Patent Application No. 2014-179764, dated Aug. 4, 2015 (9 pages).
Japanese Patent Office, "Decision of Refusal", issued in connection with Japanese patent application No. 2010-032263, dated May 7, 2014, 2 pages.
Karlsruhe, "Welcome to the NAMUR EDDL Workshop with ECT," EDDL, May 22, 2006 (47 pages).
Martin Fowler, "Language Workbenches: The Killer-App for Domain Specific Languages?" martinfowler.com; Jun. 12, 2005 (24 pages).
Philippines Intellectual Property Office, Official Action, issued for Philippines patent application serial No. 12010000052, dated Jan. 20, 2012, 2 pages.
Profibus Technology and Application—System Description, published by Profibus Nutzerorganisation e.V., Oct. 2002, pp. 1-36.
Rolf Birkhofer, XML for Automation Devices, a Multi-Schema Approach, XML Europe, May 21-25, 2001 (33 pages).
Schleipen et al., "The System-Independent Data Exchange Format CAEX for Supporting an Automatic Configuration of a Production Monitoring and Control System," IEEE International Symposium on Industrial Electronics, Jun. 30, 2008-Jul. 2, 2008 (7pages).
Schleipen M: "OPC UA supporting the automated engineering of production monitoring and control systems", IEEE ETFA 2008, Sep. 15, 2008, pp. 640-647.
Search Report, issued by the UK Patent Office dated Jun. 7, 2010, in connection with Great Britain Application No. GB1002596.3, 4 pages.
Simatic Component based Automation Getting Started with Simatic iMap, published by Siemens, Dec. 2002, pp. 1-84.
State Intellectual Property Office of China, "Office Action," issued in connection with CN Application No. 201010129196.6, dated Sep. 23, 2013, 7 pages.
State Intellectual Property Office of P.R. China, "Decision of Rejection", issued in connection with Chinese patent application No. 201010129196.6, dated Dec. 3, 2014, 9 pages.
State Intellectual Property Office of P.R. China, "Second Office action", issued in connection with Chinese patent application No. 201010129196.6, dated Jun. 3, 2014, 7 pages.
Terry Blevins, "EDDL Overview," NeSSI Meeting, EDDL, Apr. 16, 2007 (69 pages).
The State Intellectual Property Office of China, "Notification of Reexamination," issued in connection with Chinese Patent Application No. 201010129196.6, dated Dec. 30, 2015 (26 pages).
UK Intellectual Property Office, "Examination Report," issued in connection with UK Application No. GB1002596.3, dated May 31, 2013, 3 pages.
Unknown Author, "Why Should You Choose EDDL: Easier Calibration," EDDL, www.eddl.org Mar. 3, 2008 (2 pages).
Yim et al., "Using Process Topology in Plant-Wide Control Loop Performance Assessment," Computers & Chemical Engineering, vol. 31, Issue 2, Dec. 1, 2006 (14 pages).
Search Report for Application No. GB1709949.0, dated Oct. 12, 2017.

* cited by examiner

ARCHITECTURE-INDEPENDENT PROCESS CONTROL

TECHNICAL FIELD

The present disclosure relates generally to process plants and to process control systems, and more particularly, to architecture-independent process control systems.

BACKGROUND

Distributed process control systems, like those used in chemical, petroleum, or other process plants, typically include one or more process controllers communicatively coupled to one or more field devices via analog, digital, or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more processes executing within the process plant or system. Smart field devices, such as field devices conforming to the well-known Fieldbus protocol may also perform control calculations, alarming functions, and other control functions commonly implemented within a controller. The process controllers, which are also typically located within the plant environment, receive signals indicative of process measurements made by sensors or field devices and/or other information pertaining to the field devices and execute a controller application that runs, for example, different control modules that make process control decisions, generate control signals based on the received information, and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers, or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. Each of these applications provides a user-interface (UI) to allow a user (e.g., a configuration engineer, a process plant operator, a maintenance technician, etc.) to view and/or modify aspects of the process plant operation and configuration. Throughout this specification, the phrase "user interface" or "UI" is used to refer to an application or screen that allows a user to view or modify the configuration, operation, or status of the process plant. Similarly, the phrase "user-interface device" or "UI device" is used to refer to a device on which a user interface is operating, whether that device is stationary (e.g., a workstation, wall-mounted display, process control device display, etc.) or mobile (e.g., a laptop computer, tablet computer, smartphone, etc.). A configuration application, which resides in one or more operator workstations or computing devices, enables users to create or change process control modules and download these process control modules via a data highway to dedicated distributed controllers. Typically, these control modules are made up of communicatively interconnected function blocks. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the UIs, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In existing process control systems, control of the process plant involves the operation of one or more control modules implementing process control logic that communicate with field devices to send and receive process control data. Because the field devices may use any of various operation and communication protocols, the control modules must be configured to accept and provide the process control data using the appropriate protocols for each device. In addition, communication links between the control modules and the field devices may add further layers of communication protocols or formats for proper transmission and receipt of process control data. Thus, process control systems typically include a large number of control modules that perform the same or similar logic operations, but which differ in the type of data they receive from or provide to the field devices. Moreover, changes in the process control network (including replacement of field devices or changes to the communication infrastructure of the network) frequently require changes to multiple control modules. The invention described herein addresses these issues.

SUMMARY

Disclosed herein are systems and methods for creating and operating process control systems that are independent of the communication architecture of the controlled process plant. Various aspects of the described systems and methods use intermediary components to decouple, fully or partially, the process control logic operations from communication operations within a process control network of the process plant. This decoupling is achieved using signal objects or shadow blocks to communicate between control modules implementing process control logic and field devices implementing control adjustments to the process plant. The signal objects and the shadow blocks both insulate the control modules from direct communication with the field devices through the process control network's I/O architecture, and both may handle protocol conversion for process control data communicated between the control modules and the field devices. Some embodiments of the systems and methods disclosed herein may utilize both signal objects and shadow blocks, while others may utilize only signal objects or only shadow blocks.

According to an aspect of the invention described herein, a method for operating a process plant is disclosed, comprising: selecting a control module associated with a control process, associating a signal object with an input or output of the control module, and assigning a path to the signal object. The control module may receive, process, and generate process control data in order to control the process plant. According to another aspect of the invention described herein, a system for operating a process plant is disclosed, comprising: a plurality of process control devices disposed within the process plant and a controller communicatively connected to the plurality of field devices and having at least one control module, with the control module having an input to receive input process control data and an output to communicate output process control data. The input of the control module may be associated with a signal object to receive process control data, and the signal object may have an assigned path specifying an output of a process control device of the plurality of process control devices. Thus, the control module may receive process control data associated with the process control device from the signal object. Other characteristics or components of such system and method may be included in various embodiments, such as those described below.

The path assigned to the signal object may specify an input or output of a process control device of the process plant, which may be a field device. In some embodiments, the path may specify a constant data value or other data source, such as a database. Because the signal object decouples the control module from the process control device, the process control data received or generated by the field device may be independent of the I/O architecture of the process plant. To this end, the signal object may receive output data from a process control device or control module, extract process control data from the output data, and provide the process control data to a control module or process control device using a different format from the received output data. Particularly when the signal object provides process control data to a control module or user interface, the signal object may convert the output data to a standard format. Thus, the process control data may be directly used by any control module without consideration of the format, protocol, or other incidents of the I/O architecture of the process plant.

In some embodiments, additional signal objects may be associated with the control module. A second signal object may, for instance, be associated with an output of the control module to receive process control data communicated from the output of the control module. The second signal object may be assigned a path specifying an input of a process control device of the process plant, which may be the same process control device or another process control device. By so assigning the path to the second signal object, the second signal object may be caused to provide the process control data to the process control device. The signal object handles communication between the control module and the process control device, so the control module may indirectly communicate the process control data through the signal object to the process control device without regard to the I/O architecture associated with the process control device. In further embodiments, an input of a second control module may be associated with the second signal object to receive process control data from the second control object. In this manner, the input of the second control module may receive process control data from the output of the control module via the second signal object. In still further embodiments, a plurality of inputs or outputs of control modules may be associated with the same signal object, such that each control module receives process control data from or provides process control data to the same process control device via the signal object. Additional control modules or signal objects may similarly be added and connected in various configurations.

The control modules may be implemented as instances of a class in an object oriented programming language in some embodiments. Thus, multiple instances of the control module class may be updated automatically when the control module class is updated. A plurality of control modules or control module classes may be stored in a library, from which they may be selected for use in the process control system. Signal objects or signal object classes may similarly be stored in a library. In further embodiments, a library may store a plurality of control strategies. Each control strategy may contain one or more control modules, and each control module within the control strategy may have one or more signal objects associated with it. Thus, selecting a control strategy may cause one or more control modules with associated signal object to be included in the process control system. The signal objects associated with the control modules of the control strategies may or may not include assigned paths.

In some embodiments, one or more signal objects may not be associated with any control modules. Such unassociated signal objects may communicate with a user interface to provide process control data to the user interface or to receive process control data from the user interface without using control modules. For example, a signal object may be assigned a path specifying an output of a process control device to receive process control data from the process control device. Such signal object may be directly associated with the user interface to provide the process control data from the process control device to the user interface without using any control modules. The user interface may then cause the process control data to be presented to a process plant operator or other user. The signal object may perform scaling, alarm, or bit picking operations on the process control data. Scaling may include providing information regarding the scale of the process control data or converting the process control data to a preferred scale. Alarming may include generating an alarm based upon alarm criteria when the process control data meet the alarm criteria, causing the user interface to present an alarm to the user. The alarm criteria may be predetermined or configured by the user. Bit picking may include selecting one or more specific bits from one or more output data streams generated by one or more process control devices.

Some embodiments may include testing the operation of the process control system. Testing the process control system may include assigning a test path associated with test data to one or more signal objects and executing one or more control modules using the test data to simulate operation of the control modules within the process control system. The test data may include one or more sets of test data indicative of operating conditions within the process plant and may be independent of the I/O architecture of the process plant. Testing the operation of the one or more control modules may include receiving output process control data from the module for each set of test data, recording the received output process control data, and verifying proper functioning of the control modules using the recorded output process control data. Testing may further include determining a control module is not functioning within predetermined quality parameters using the recorded output process control data and adjusting one or more parameters of the control module or one or more signal objects. After such adjustments, the one or more control modules may again be tested using the test data. When testing is completed, information indicating at least a portion of the I/O architecture of the process plant may be received and used to assign paths to one or more signal objects. In some embodiments, the configured one or more control modules and associated signal objects may be stored in a memory by a first computer and retrieved from the memory by a second computer to implement the process control system to assign paths to the signal objects. In further embodiments, paths may be assigned to one or more signal objects at runtime during execution of the associated control modules in operating the process plant.

According to another aspect of the invention described herein, a method for operating a process plant is disclosed, comprising: receiving an indication of a control module for operating the process plant at a controller communicatively connected to a plurality of field devices, associating a generic shadow block within the controller with the control module, receiving description data regarding a field device communicatively connected to the controller, and configuring the generic shadow block to mimic within the controller the operation of the function block of the field device based upon the received description data. The description data describes a function of the field device, which may include a description of a function block operating within the field device. In some embodiments, the description data may include data describing the field device in a text-based standard description language. The description data may further include information regarding the I/O architecture associated with the field device. In some embodiments, part or all the description data may be received by transmitting a request for the description data to the field device and receiving the description data from the field device. Part or all of the description data may instead be received from a database containing information regarding the process plant.

Associating the generic shadow block with the control module may include specifying a reference of either an input or an output of the control module in order to identify the generic shadow block. Such reference may specify a path to the field device. A reference of an input or output of the control module may similarly be specified to identify a constant value. Some embodiments may include associating one or more additional generic shadow blocks within the controller with inputs or outputs of the control module, receiving additional description data, and configuring the one or more additional generic shadow blocks. The additional description data may include information regarding one or more additional field devices communicatively connected to the controller, which may include descriptions of function blocks of such additional field devices. The one or more additional generic shadow blocks may be identical to the generic shadow block prior to configuration, such that configuration using the additional description data causes the generic shadow blocks to become specifically configured to mimic within the controller the operation of the function blocks of the one or more additional field devices. Thus, the generic shadow blocks may be used even with field devices or function blocks within field devices that differ in type or that use different communication protocols.

Upon execution of the control module, the controller may determine whether the generic shadow block has been configured. If the generic shadow block has not been configured, the controller may configure the generic shadow block by receiving an indication of the field device, receiving description data regarding the field device based upon the received indication of the field device, and configuring the generic shadow block using the received description data. In some embodiments, the indication of the field device may be selected by a process plant operator. The indication of the field device may likewise be received from a database containing information regarding the process plant.

In further embodiments, the configured shadow block may receive and convert process control data for communication between the control module and the field device. The configured shadow block may receive process control data from the field device, convert the received process control data to a standard format that is independent of the configuration of the generic shadow block using the description data, and provide the converted process control data in the standard format to an input of the control module. The configured shadow block may similarly receive process control data from an output of the control module in a standard format that is independent of the field device and the I/O architecture of the process plant, convert the process control data from the standard format to a second format used by the field device, and communicate the converted process control data to the field device.

In some embodiments, the control module may be an instance of a class of control modules that are independent of the type of the field device and the I/O architecture of the process plant. The generic shadow block may similarly be an instance of a class of generic shadow blocks. One or more generic shadow blocks may automatically be associated with the control module based upon the class of the control module. To allow each class of control modules to cover more process plant configurations or operations, control modules may include options to ignore one or more inputs from or outputs to the generic shadow blocks. Further, the control module or an aspect of the control module may be presented to the process plant operator or other user of the process control system using a standard format based upon the control module class. For example, a user interface configured to operate the process plant may be generated at the controller or at a user device, which user interface may include a representation of the control module. The user interface may present information regarding the process plant to the process plant operator or other user, which may include one or more representations of control modules of the same class, such that all control modules of the same class are represented by the same standard format.

DETAILED DESCRIPTION

Process control systems are used in a wide range of industrial applications to monitor and operate process plants. Such process control systems may be structured to utilize control modules implementing control logic blocks, loops, routines, or functions. The control modules receive input process control data (e.g., from measurement devices within the process plant) and generate output process control data (e.g., control commands to operate valves, pumps, etc.). The control modules frequently execute in a controller that is remote from the field devices that generate the input process control data or receive the output process control data. To communicate with such field devices, the control modules may cause process control data to be transmitted or received through various communication links of the process plant that make up the I/O architecture of the process plant. As used herein, "I/O architecture" means the physical and communication infrastructure of all or a portion of the process plant, which may include numbers and types of communication links, communication relays or switches, communication protocols, communication formats, types of devices, device specifications, device protocols, and device operation or communication formats.

To manage communication of process control data or other data over the I/O architecture, various embodiments of the invention described herein may utilize shadow blocks or signal objects. The shadow blocks or signal objects decouple the control modules from the I/O architecture to varying degrees by managing aspects of communication between the control modules and the field devices. The shadow blocks may be configured to mimic operation of the field devices (or function blocks within the field devices) within the controller or other device executing the control modules, thus allowing the control modules to interact with the shadow blocks as though they were the actual field devices. The shadow blocks may then send and receive process control data using the I/O architecture. The signal objects may be configured to connect the control modules to the field devices, which may include translating the process control data between protocols used in the I/O architecture and standard formats used by the control modules. The signal objects may thus be used to manage communication between a control module and field devices or other control modules. Signal objects may also be used to directly communicate process control data to a user interface, thereby bypassing the control modules for simple presentation or alarm functionality.

System Overview

Figure 1A:
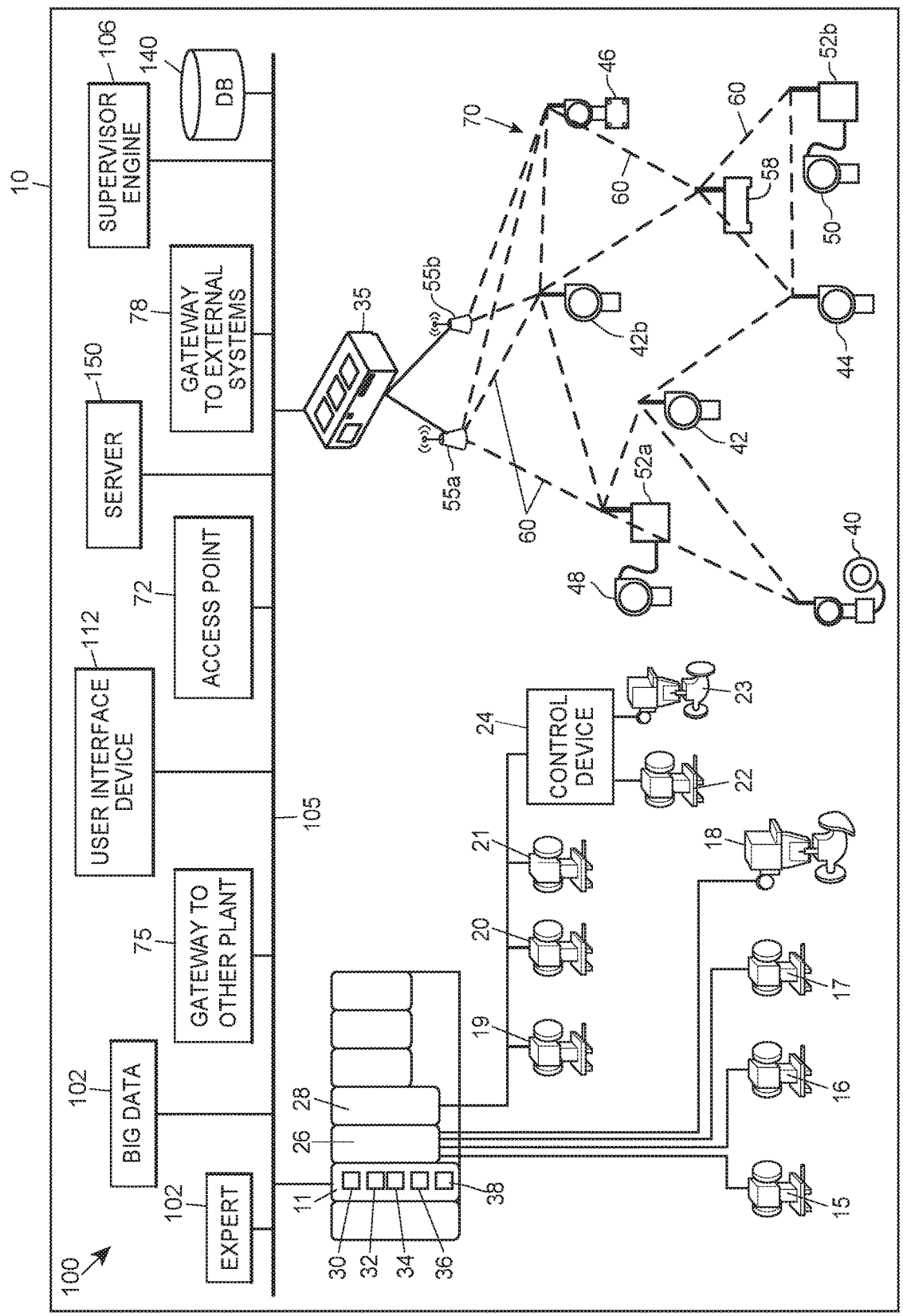
FIGS. 1A-B are block diagrams of an exemplary process control network operating in a process control system or process plant.

Turning first to the overall architecture of an example process plant, FIG. 1A is a block diagram of an exemplary process control network 100 operating in a process control system or process plant 10 (or portion thereof). The process control network 100 may include a network backbone 105 providing connectivity directly or indirectly between a variety of other devices. The devices coupled to the network backbone 105 include, in various embodiments, combinations of access points 72, gateways 75 to other process plants (e.g., via an intranet or corporate wide area network), gateways 78 to external systems (e.g., to the Internet), UI devices 112, servers 150, databases 140, big data appliances 102 (e.g., including big data historians), big data expert systems 104, supervisor engines 106, controllers 11, input/output (I/O) cards 26 and 28, wired field devices 15-23, wired control devices 24, wireless gateways 35, and wireless communication networks 70. The communication networks 70 may include wireless devices 40-58, which include wireless field devices 40-46, wireless adapters 52a and 52b, access points 55a and 55b, and router 58. The wireless adapters 52a and 52b may be connected to non-wireless field devices 48 and 50, respectively. The controller 11 may include a processor 30, a memory 32, and one or more control routines 38. Although FIG. 1A depicts only a single one of some of the devices connected to the network backbone 105, it will be understood that each of the devices could have multiple instances on the network backbone 105 and, in fact, that the process plant 10 may include multiple network backbones 105.

The UI devices 112 may be communicatively connected to the controller 11 and the wireless gateway 35 via the network backbone 105. The controller 11 may be communicatively connected to wired field devices 15-23 via I/O cards 26 and 28 and may be communicatively connected to wireless field devices 40-46 and non-wireless field devices 48-50 via the network backbone 105 and a wireless gateway 35. Some field devices 22 and 23 may be indirectly connected to the controller 11 through a control device 24 that communicates directly with the field devices 22 and 23 and communicates via an I/O card 28 with the controller 11. The controller 11 may operate to implement a batch process or a continuous process using at least some of the field devices 15-23 and 40-50. The controller 11, which may be, by way of example, the DeltaV™ controller sold by Emerson Process Management, is communicatively connected to the process control network backbone 105. The controller 11 may also be communicatively connected to the field devices 15-23 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-23 and 48-50, the control device 24, and the I/O cards 26, 28 are wired devices, and the field devices 40-46 are wireless field devices. Unless the context indicates otherwise, however, any of the field devices 15-23 or 40-50 referenced herein could be implemented as a wired or wireless field device, and communication connections between the controller 11 and the field devices 15-23 or 40-50 could include either or both of wired or wireless connections. Although process control is discussed herein in terms of field devices, any type of process control device may be used in any of the variously described embodiments.

In operation of the UI device 112, the UI device 112 may, in some embodiments, execute a user interface ("UI"), allowing the UI device 112 to accept input via an input interface and provide output at a display. The UI device 112 may receive data (e.g., process related data such as process parameters, log data, sensor data, and/or any other data that may be captured and stored in the big data appliance 102), from the server 150. In other embodiments, the UI may be executed, in whole or in part, at the server 150, where the server 150 may transmit display data to the UI device 112. The UI device 112 may receive UI data (which may include display data and process parameter data) via the backbone 105 from other nodes in the process control network 100, such as the controller 11, the wireless gateway 35, or the server 150. Based on the UI data received at the UI device 112, the UI device 112 provides output (i.e., visual representations or graphics) representing aspects of the process associated with the process control network 100, allowing the user to monitor the process. The user may also control the process by providing input at the UI device 112. To illustrate, the UI device 112 may provide graphics representing, for example, a tank filling process (including data from one or more field devices). In such a scenario, the user may read a tank level measurement and decide that the tank needs to be filled. The user may interact with an inlet valve graphic displayed at the UI device 112 and input a command causing the inlet valve to open.

In further operation, the UI device 112 may execute a number of routines, modules, or services in addition to the UI. In one embodiment the UI device 112 may execute a context awareness routine, which may include, for example, various routines or sub-routines related to location awareness, equipment awareness, or scheduling awareness. These context routines may enable the UI device 112 to render a graphical user interface configuration ("GUI configuration") suited to a particular environment or context in which the UI device 112 is operating. The UI device 112 may also execute a state determination routine, enabling the UI device 112 to track and save the state of the UI device 112, including the state of the applications being executed at the UI device 112 (such as the UI). By tracking the state of applications on the UI device 112, the UI device 112 may allow a user to, for example, initiate a session on a first UI device 112 and start using a second UI device 112, resuming work flow from his previous session with minimal interruption.

The UI device 112 (or the server serving an application or screen to the UI device 112) may also execute routines related to managing plant assets. For example, some routines may be used for installing, replacing, maintaining, calibrating, diagnosing, or commissioning assets in the process plant. Other routines may be used to prepare or complete work orders associated with particular assets and/or to notify plant personnel (e.g., personnel in the vicinity of a particular device) of a work order. The UI device 112 may execute routines related to monitoring the process. For example, some routines may be used for field logging instrument data, reporting lab samples, displaying real-time asset parameters, and the like. The UI device 112 may further execute routines related to compliance with plant procedures and workflow. For example, some routines may provide information related to standard operating procedures (SOPs), start-up procedures, shut-down procedures, lockout procedures, work instructions, or other product/asset documentation. Still additional routines may, when the UI device 112 is coupled to a network, facilitate immediate delivery of work orders and immediate system availability to off-line, manually entered data. Communication routines may include e-mail routines, text messaging routines, instant messaging routines, etc., for facilitating communication between plant personnel and/or external parties providing technical or other support.

The UI device 112 (or the server serving an application or screen to the UI device 112) may further include routines supporting and/or facilitating one or more audit processes. The audit processes may include, for example, work audits and/or regulatory audits. In embodiments, the routines may allow a user to view data and/or generate reports related to data collected, maintained, and/or collated for the purposes of satisfying regulatory requirements. For purposes of illustration, where the mobile control room is implemented in a pharmaceutical manufacturing plant, the mobile control room may facilitate viewing or reporting of data collected for the purposes of satisfying government requirements related to the safety of the product output of the plant. In embodiments, the routines may allow a user to view and/or generate reports related to auditing of work orders, maintenance, or other plant processes.

In certain embodiments, the UI device 112 may implement any type of client, such as a thin client, web client, or thick client. For example, the UI device 112 may depend on other nodes, computers, or servers for the bulk of the processing necessary for operation of the UI device 112. In such an example, the UI device 112 may communicate with the server 150, where the server 150 may communicate with one or more other nodes on the process control network 100 and may determine the display data and/or process control data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112.

In other embodiments, the UI device 112 may be a web client. In such an embodiment, a user of the UI device 112 may interact with the process control system via a browser at the UI device 112. The browser enables the user to access data and resources at another node or server 150 (such as the server 150) via the backbone 105. For example, the browser may receive UI data, such as display data or process parameter data, from the server 150, allowing the browser to depict graphics for controlling and/or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic. In yet other embodiments, the bulk of the processing for the UI device 112 may take place at the UI device 112. For example, the UI device 112 may execute the previously discussed UI, state determination routine, and context awareness routine. The UI device 112 may also store, access, and analyze data locally.

In operation, a user may interact with the UI device 112 to monitor or control one or more devices in the process control network 100, such as any of the field devices 15-23 or the devices 40-50. The user may interact with the UI device 112, for example, to modify or change a parameter associated with a control routine 38 stored in the controller 11. The processor 30 of the controller 11 implements or oversees one or more process control routines 38 (stored in a memory 32), which may include control loops. The processor 30 may communicate with the field devices 15-23 and 40-50 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process plant 10 may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner.

In some embodiments of the UI device 112, a user may interact with the UI device 112 to implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process plant 10. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with Fieldbus devices. In instances where the functions blocks are implemented by the field devices themselves, shadow blocks 36 may be executed by the controller 11 to mimic operation of the function blocks. The controller 11 may include one or more control routines 38 that may implement one or more control loops. Each control loop is typically referred to as a control module 34, and may be performed by executing one or more of the function blocks.

The UI device 112 interacts, in some embodiments, with the big data appliance 102 and/or the expert system 104 and/or the supervisor engine 106. The big data appliance 102 may collect and store all types of process control data from the process plant 10, including sensor data, control parameters, manually input data (e.g., static data entered by a process plant operator), personnel locations and command inputs, time stamps associated with all of the data, and any other type of data available in the process plant 10. The expert system 104, communicatively coupled to the big data appliance 102, may operate independently or according to specific user inputs to analyze process plant data stored in the big data appliance 102. The expert system 104 may develop and/or use models, recognize data trends and/or correlations, alert plant personnel to actual or predicted problems and/or abnormal situations and/or sub-optimal conditions that may be affecting or will soon affect the process plant 10, etc. In some embodiments, the expert system 104 performs these functions without being programmed specifically to associate a particular set of data or trends with a particular problem or condition and, instead, recognizes that a current trend or data concurrence has occurred before at or around the time of a previous condition (which could be a positive/desirable condition or a negative/undesirable condition). From the recognition of the prior occurrence of the trend or data concurrence, the expert system 104 may predict the condition. The expert system 104 may also determine from the data stored in the big data appliance 102 which process variables, sensor readings, etc., are most important in detecting, predicting, preventing and/or correcting an abnormal situation in the process plant 10. For example, the expert system 104 may determine that hydrocarbons are being vented from a stack and may automatically determine the cause of the hydrocarbon venting and/or cause work items to be generated (e.g., by the supervisor engine 106) to correct the problem causing the hydrocarbon venting and/or cause work items to be generated to inspect equipment or observe/record a parameter that is not available via the network. As another example, the expert system 104 may determine that a trend indicated by a series of previous data points indicates a predicted abnormal situation, a predicted maintenance concern, a predicted failure, etc.

As described in detail below, the supervisor engine 106 may interact with the big data appliance 102 and/or the expert system 104 to perform automatically and/or facilitate various supervisory activities. For example, the supervisor engine 106 may monitor trends identified by the expert system 104 and create work items for plant personnel. As another example, the supervisor engine 106 may monitor calibration status of process plant resources and may create work items for plant personnel. In connection with these functions, the supervisor engine 106 may also manage personnel certifications, permissions to access equipment during performance of scheduled work items, and timing of work item performance. The supervisor engine 106 may interact with the UI devices 112 to assign and track the performance of work items, and follow-up after the completion of a work item to verify that the status or indication that resulted in the creation of the work item (e.g., the identified trend, abnormal situation, etc.) is resolved. For instance, the supervisor engine 106 may determine from the expert system 104 that a valve is faulty and create a work item. The supervisor engine 106 may later determine that a maintenance worker carrying a UI device 112 is in the vicinity of the faulty valve, and request to assign the work item to the maintenance worker, who may, via the UI device 112, accept the work item. The supervisor engine 106 may verify that the maintenance worker has the proper skill set to perform the work item, and may provide the necessary permissions for the maintenance worker to perform the work item. Additionally, the supervisor engine 106 may reschedule process control activities so that the work item may be completed. The supervisor engine 106 may provide standard operating procedures, manuals, and other documentation to the personnel before and/or during the performance of the work item. These are but a few examples of the supervisor engine 106, which will be further explained below.

Referring still to FIG. 1A, the wireless field devices 40-46 communicate in a wireless network 70 using a wireless protocol, such as the Wireless HART® protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-23 and 40-46 could conform to any other desired standard(s) or protocols, such as any wired or wireless protocols, including any standards or protocols developed in the future.

The wireless gateway 35 may provide access to various wireless devices 40-58 of a wireless communication network 70. In particular, the wireless gateway 35 provides communicative coupling between the wireless devices 40-58 and other nodes of the process control network 100 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 70. Furthermore, the wireless gateway 35 may provide network management and administrative functions for the wireless network 70, such as resource management, performance adjustments, network fault mitigation, monitoring traffic, security, and the like.

Similar to the wired field devices 15-23, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART® device. To communicate within the network 30, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 30 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 30. The wireless devices 32-46 and 52-58 may communicate with each other and with the wireless gateway 35 over wireless links 60 of the wireless communication network 70.

Accordingly, FIG. 1A includes several examples of provider devices which primarily serve to provide network routing functionality and administration to various networks of the process control system. For example, the wireless gateway 35, the access points 55a, 55b, and the router 58 include functionality to route wireless packets in the wireless communication network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as Wireless HART®.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates over the process control network 100 using a wireless access point 72. In some scenarios, in addition to portable computing devices, one or more process control devices (e.g., controller 11, field devices 15-23, or wireless devices 35, 40-58) may also communicate using the wireless network supported by the access points 72.

Additionally or alternatively, the provider devices may include one or more gateways 75, 78 to systems that are external to the immediate process plant 10. In such embodiments, the UI device 112 may be used to control, monitor, or otherwise communicate with said external systems. Typically, such systems are consumers or suppliers of information generated, used, or changed by the process plant 10. For example, a plant gateway node 75 may communicatively connect the immediate process plant 10 (having its own respective process control data network backbone 105) with another process plant having its own respective network backbone. In an embodiment, a single network backbone 105 may service multiple process plants or process control environments.

In another example, the plant gateway node 75 may communicatively connect the immediate process plant to a legacy or prior art process plant that does not include a process control network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant. In other examples, the backbone 105 may include a legacy system of the plant 10, and the plant gateway node 75 may connect the legacy system backbone 105 to a big data backbone of another plant.

The provider devices may include one or more external system gateway nodes 78 to communicatively connect the process control network 100 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, or other external systems. The external system gateway nodes 78 may, for example, facilitate communication between the process control system and personnel outside of the process plant (e.g., personnel at home). In one such instance, an operator or maintenance technician may use the UI device 112 from her home, connecting to the network backbone 105 via a home network (not shown), the Internet, and the gateway 78. In another instance, an operator or maintenance technician may use the UI device 112 from any location, connecting to the network backbone 105 via a mobile telephony network (not shown), the Internet, and the gateway 78. The gateway nodes 78 may also facilitate communication between plant personnel in the process plant and entities or people outside of the process plant. For example, a technician performing service on a process control device in the process plant may communicate from her UI device 112 with a support representative from the manufacturer of the process control device. In still another example, the supervisor engine 106 may monitor weather, track incoming supply shipments, track financial data (e.g., commodity futures), and the like, to assist the supervisor engine 106 in scheduling work items, managing production schedules, etc. Of course, all connections formed via the gateway 78 (or the gateway 75 or, in fact, between any two devices) may be secured connections (e.g., encrypted connections, firewalled connections, etc.).

Although FIG. 1A illustrates a single controller 11 with a finite number of field devices 15-23 and 40-50, this is only an illustrative and a non-limiting embodiment. Any number of controllers 11 may be included in the provider devices of the process control network 100, and any of the controllers 11 may communicate with any number of wired or wireless field devices 15-23, 40-50 to control a process in the plan 10. Furthermore, the process plant 10 may also include any number of wireless gateways 35, routers 58, access points 55, wireless process control communication networks 70, access points 72, and/or gateways 75, 78.

Figure 1B:
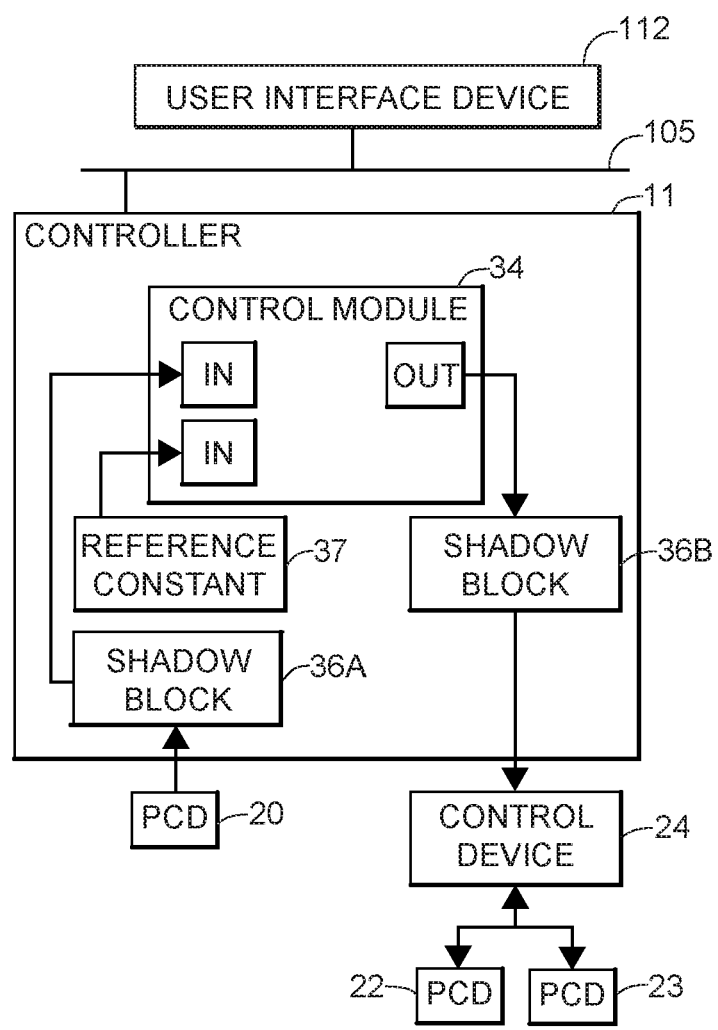

FIG. 1B is a block diagram of a portion of the process control network 100 operating in a process control system of process plant 10, particularly illustrating the operation of an exemplary controller 11. As shown, the controller 11 is communicatively connected to the user interface device 112 through the network backbone 105. The controller 11 is further connected to field devices 20, 22, and 23, as well as the control device 24. Specifically, the controller 11 is connected to the field devices 22 and 23 through the control device 24. Additional communication links or components in the I/O architecture (not shown) may further be included in various embodiments.

The block diagram of FIG. 1B particularly illustrates the configuration of a control module 34 that uses shadow blocks 36 to represent within the controller 11 the function blocks implemented within the field devices 20, 22, and 23. The control module 34 may be any type of control module used in operation of the process plant 10, such as a PID controller. Only one control module 34 is shown for clarity, but process plant controllers typically include a plurality of control modules. Such control modules may be implemented as hardware modules, software modules, or a combination of each. The control module 34 may include any number of inputs (IN) and outputs (OUT), each of which may reference a data source as an input or a component as an output. Inputs or outputs may likewise reference other control modules. The exemplary control module 34 receives inputs from a shadow block 36A mimicking field device 20 and a reference constant 37. The exemplary control module 34 processes the input data to generate an output to shadow block 36B mimicking one or more of the field devices 22 or 23. The shadow block 36A communicates with the field device 20, and the shadow block 36B communicates with the control device 24. The control device 24 further communicates with and controls field devices 22 and 23, which may be legacy field devices or other field devices incapable of direct communication with the controller 11 in some embodiments.

The shadow blocks 36 are implemented by the control module 34 to mimic the operation of function blocks (not shown) within the field devices 20, 22, and 23, as discussed further below. This insulates the control module 34 from the necessity of establishing and maintaining communications with the field devices 20, 22, and 23 via the I/O architecture. By using shadow blocks, the control module 34 may perform process monitoring and control functions without concern for the I/O architecture connecting the controller 11 and the field devices 20, 22, and 23. The shadow blocks 36 must, however, be configured to establish and maintain communication links with the field devices 20, 22, and 23. Thus, the shadow blocks 36 must be aware of the I/O architecture, the communication protocols, and the operational specifications of the field devices 20, 22, and 23. Additionally, in some embodiments, the control module 34 must be configured to communicate with the shadow blocks 36 using appropriate protocols used by the field devices 20, 22, and 23.

The reference constant 37 is a stored value that may be permanently fixed, set by the process plant operator or other user, or generated by the controller 11 or other computing device within the process control network 100. For example, the reference constant 37 may be set periodically or upon occurrence of an event (such as during initial set-up of the process plant 10) by the big data appliances 102, the expert system 104, the supervisor engine 106, or the server 150. In some embodiments, the reference constant 37 may be set by the process plant operator via the UI device 112 or retrieved from the database 140. As a further example, the reference constant 37 may contain a constant data value, such as a set point for a process condition.

FIG. 1B is intended to illustrate that the present description is not limited in scope to the process plant described with respect to FIG. 1A, and may be applicable to other control, monitoring, and safety systems, and the like. While the present description describes embodiments in terms of the process plant 10, this convention is for purposes of convenience only, and is not intended to be limiting.

Signal Objects

According to an aspect of the invention disclosed herein, signal objects may be used to decouple the control logic and user interfaces used to operation the process plant 10 from the communication with field devices within the process control network 100. The signal objects may be disposed in the controller 11 or UI device 112 and may be configured to establish, maintain, or utilize communication connections with field devices 15-23, 40-50. The signal objects may be associated with control modules 34 to facilitate process control by communicating process control data between control modules or between control modules and field devices. To enable such communications, the signal objects may also be assigned paths specifying data sources from which to receive process control data or data targets to which process control data is to be sent. To further decouple the control modules from communication with the field devices, the signal objects may receive process control data that is independent of the I/O architecture associated with the field devices of the process plant and communicate the process control data to the field devices in a manner that accounts for the relevant I/O architecture. Similarly, the signal objects may provide process control data to control modules in a standard format, regardless of the I/O architecture associated with the received process control data.

Figure 2:
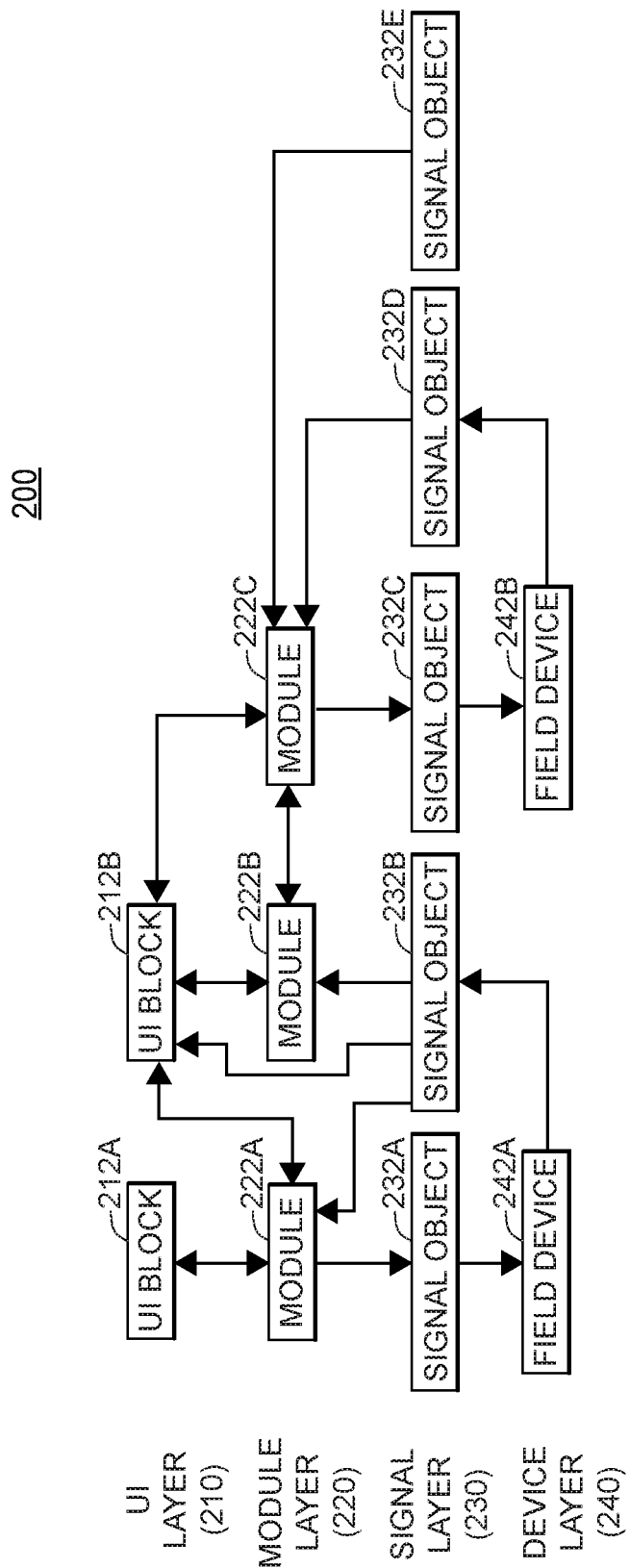
FIG. 2 is a block diagram illustrating an exemplary communication structure of a process control system of the process control network, in accordance with the description herein.

FIG. 2 is a block diagram illustrating an exemplary communication structure of a process control system 200 of the process control network 100, showing communication between layers of the process control system. The process control system 200 monitors and controls at least a portion of the process plant 10 according to the methods described herein. Although the process control system 200 is implemented using various components of the process control network 100, such components and communication architecture are omitted from FIG. 2 to improve clarity of the salient features. The exemplary process control system 200 includes four layers: a user interface (UI) layer 210, a module layer 220, a signal layer 230, and a device layer 240.

The layers 210, 220, 230, and 240 communicate in order to operate the process plant 10. The UI blocks 212 of the UI layer 210 present information to the process plant operator and receive commands regarding changes in process plant operations. The UI layer 210 communicates with the module layer 220, and the UI layer 210 may also communicate with the signal layer 230 in some embodiments. The UI blocks 212 receive process control data from the control modules 222 or the signal objects 232, which process control data may be presented to the process plant operator, processed to generate additional data, or stored for later use. The UI blocks 212 also send indications of process control data or control commands to the control modules 222 in the module layer 220 to operate the process plant 10. In some embodiments, the UI blocks 212 may also send indications of process control data or control commands directly to signal objects 232 in the signal layer 230 in order to operate the process plant 10. The control modules 222 are configured to operate the process plant 10 according to parameters or metrics, which may be set or adjusted by the process plant operator via the UI blocks 212. To operate the process plant 10, the control modules 222 receive process control data generated by the field devices 242, process the process control data, and send other process control data (i.e., control commands) to the field devices 242.

The field devices 242 provide process control data to the control modules 222 through the signal objects 232, and the control modules 222 receive the process control data from the field devices 242 through the signal objects 232. Additionally, the control modules 222 also send process control data to the field devices 242 through the signal objects 232, and the field devices 242 receive the process control data through the signal objects 232. The signal objects 232 serve as communication links between the field devices 242 and the control modules 222 or the UI blocks 212 to translate or convert process control data and maintain communication connections between the control modules 222 and the field devices 242. By inserting the signal layer 230 between the module layer 220 and the device layer 240, the control modules 222 are decoupled from the field devices 242. Such decoupling allows the control modules 222 to operate in a manner independent of specific field device configurations or the I/O architecture of the process plant 10.

The UI layer 210 includes UI blocks 212 that implement part or all of a UI program that presents information to and receives commands from the process plant operator. The UI blocks 212 may execute in one or more UI devices 112, servers 150, or controllers 11. Each UI block 212 may implement some process control interface functions, such as displaying process plant information to the process plant operator, setting operating conditions within a portion of the process plant 10, setting or presenting alarms to the process plant operator, or presenting summary information to the process plant operator. The UI blocks 212 may receive process information from one or more modules 222 or from signal objects 232, which may include process control data. Some received process information may be summarized or used to generate additional information to present to the process plant operator via the UI device 112. Additionally, some UI blocks 212 may store or track received information for use or presentation to the process plant operator upon request, without otherwise displaying the process information. Each UI block 212 may be a part of a process control system or may be a separate process control system, which may execute on different devices for different users. Some UI blocks 212 may also be configured to receive inputs from a user (e.g., the process plant operator) to control one or more aspects of the operation of the process plant 10 through the modules 222. For example, the process plant operator may select a change to a parameter (e.g., temperature, pressure, flow rate, etc.) within the process plant 10, which may be communicated to one or more modules 222 to implement. Although the exemplary process control system 200 illustrates two UI blocks 212A and 212B, any number of such UI blocks 212 may be included in various embodiments.

The module layer 220 includes control modules 222 that perform monitoring and control operations within the process plant 10. Each control module 222 may be a control module 34 running in the controller 11, as discussed further elsewhere herein. The control modules 222 may also be implemented by one or more UI devices 112, server 150, expert system 104, or supervisor engines 106 in various embodiments. The control modules 222 may be controlled, configured, or selected by the process plant operator via the UI blocks 212, and the control modules 222 may provide process information to the UI blocks 212. In some embodiments, the control modules 222 may be initially configured by a process engineer or technician when the process control network 100 or control system is originally configured. The control modules 222 may implement control loops or control routines to maintain proper functioning of the process plant 10, such as feedback loops (e.g., PID loops, PI loops, PD loops, etc.), or feed-forward loops. To control the process plant 10, the control modules 222 receive input signals from one or more signal objects 232 representing the output of one or more field devices 242. The control modules 222 may further generate output signals, which may be passed through the signal objects 232 to control one or more of the field devices 242. Although the exemplary process control system 200 illustrates three control modules 222A, 222B, and 222C, any number of such control modules 222 may be included in various embodiments.

The signal layer 230 includes signal objects 232 that provide process control data to or receive process control data from the control modules 222. Signal objects 232 may be associated with inputs or outputs of the control modules 222 to communicate process control data in a standard format. The signal objects 232 may further be configured to communicate process control data with the field devices, which may be communicated in a different format or protocol than the standard format. The signal objects 232 may be data objects stored in a memory 32 of the controller 11. Alternatively, the signal objects 232 may be implemented by one or more UI devices 112, servers 150, expert system 104, or supervisor engines 106. It is particularly advantageous to implement each signal object 232 in the same hardware device (e.g., controller 11, UI device 11, or server 150) in which corresponding control modules 222 are implemented. Co-locating the signal objects 232 and the control modules 222 in the same device enables more efficient communication, reduces complexity, and improves speed. For example, the control modules 222 and signal devices 232 with which they are associated may be stored in the memory 32 and executed as software modules by the processor 30 of the controller 11. Some instances or embodiments may, however, include one or more control modules 222 implemented at different devices from the signal objects 232 with which they are associated. For example, some control modules 232 may be implemented by the UI device 112 while being associated with signal objects implemented by the controller 11. Although the exemplary process control system 200 illustrates five signal objects 232A, 232B, 232C, 232D, and 232E, any number of such signal objects may be included in various embodiments.

The device layer 240 includes field devices 242 that monitor and control conditions and equipment within the process plant 10. Each field device 242 produces process control data (i.e., generating sensor data regarding a condition within a portion of the process plant 10, such as temperature, stock levels, pressure, flow rate, etc.) or implements process control actions based upon received process control data (i.e., implements a physical control function within the process plant 10, such as opening or closing a valve, adjusting the speed of a motor, operating a pump, etc.). Some field devices 242 both produce process control data and implement process control actions. Although the exemplary process control system 200 illustrates two field devices 242A and 242B, any number of such field devices 242 may be included in various embodiments. Each field device 242 may be a wired or wireless control device 15-23 or 40-50, as discussed further elsewhere herein. Some field devices 242 may execute function blocks (not shown), as discussed elsewhere herein.

As illustrated in FIG. 2, the UI blocks 212 may be communicatively connected to one or more control modules 222, and each control module 222 may be communicatively connected to one or more UI blocks 212. For example, control module 222A communicates with both UI blocks 212A and 212B, but control modules 222B and 222C communicate only with UI block 212B. The control modules 222 may communicate with other control modules 222. For example, control module 222B communicates with control module 222C. Such communication between control modules 222 may facilitate process control using feedback or feed-forward control loops, as well as more sophisticated measurement analysis and response determination. In some embodiments, a control module 222 may be configured to communicate an output to an input of the same control module 222. In some embodiments, the UI blocks 212 may be communicatively connected to one or more signal objects 232 without intermediate control modules 222. For example, UI block 212B is directly communicatively connected to signal object 232B, such that UI block 212B receives process control data or other information from signal object 232B without the process control data or other information passing through any of the control modules 222.

Each signal objects 232 may receive process control data from one or more control modules 222 or field devices 242. In some embodiments, some signal objects 232 may receive process control data from both a control module 222 and a field device 242. In other embodiments, each signal object 232 receives process control data at most from either one or more control modules 222 or one or more field devices 242. One such embodiment is illustrated in FIG. 2, wherein signal objects 232A and 232C receive process control data only from control modules 222, signal objects 232B and 232D receive process control data only from field devices 242, and signal object 232E does not receive process control data from either the control modules 222 or the field devices 242. In further embodiments, each signal object 232 may be associated with one or fewer field devices 242, but may nonetheless be associated with more than one input and/or output in some instances. In still further embodiments, each signal object 232 may be associated with at most one input or output of one field device 242, as illustrated in FIG. 2. The signal object 232A is associated with an input of the field device 242A, while signal object 232B is associated with an output of the field device 242A. Similarly, the signal object 232C is associated with an input of the field device 242B, while signal object 232D is associated with an output of the field device 242B. Signal object 232E is not associated with any field devices 242. Instead, signal object 232E may be incompletely configured (i.e., it may not yet have been assigned a path to a field device 242), or signal object 232E may contain static or constant data. In some embodiments, signal object 232E may include a path to an external data source, such as a database 140, or may be configured to receive input from a process plant operator.

Each signal object 232 may be associated with one or more control modules 222 to provide or receive process control data. In some embodiments, signal objects 232 may be associated with multiple control modules 222, as illustrated by signal object 232B, which is communicatively connected to both control modules 222A and 222B. In other embodiments, each signal object 232 may only be associated with at most one control module 222 (or UI block 212) to either receive process control data or provide process control data. In additional embodiments, each signal object 232 may be created only when associated with one control module 222 or UI block 212, such that each signal object 232 does not exist unless associated with a control module 222 or UI block 212. This is not required, however, as other embodiments may include signal objects 232 that exist without being associated with a control module 222 or UI block 212. Such unassociated signal objects 232 may be configured to be communicatively connected to a field device 242 or may be stored in a library of signal objects 232.

Figure 3:
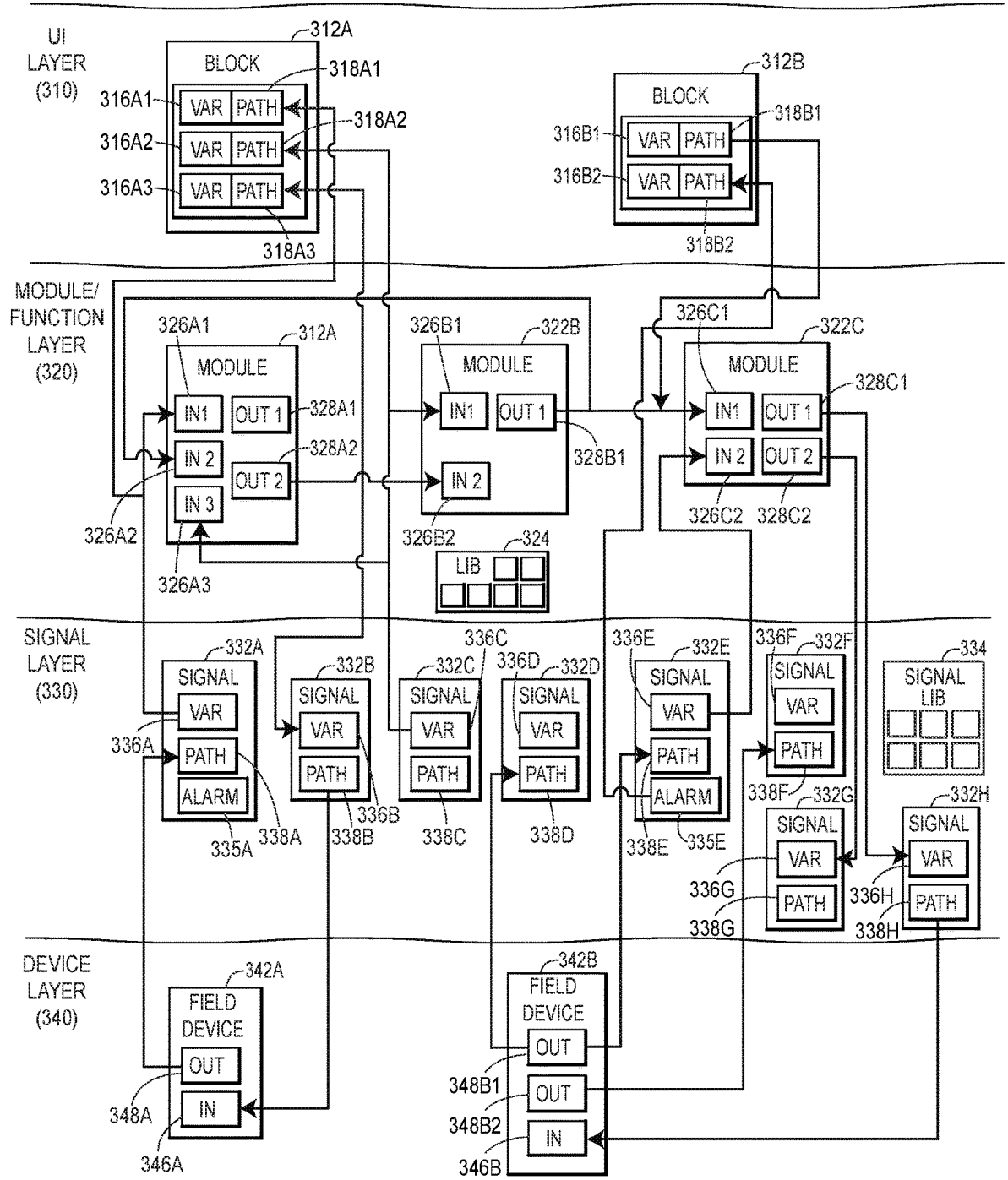
FIG. 3 is a block diagram further illustrating an exemplary communication structure of a process control system of the process control network, in accordance with the description herein.

FIG. 3 illustrates an exemplary communication structure of a process control system 300 of the process control network 100 in further detail, showing inputs, outputs, variables, paths, and alarms within the various components. Additional connections and elements are illustrated in the exemplary process control system 300, but the system 300 may be the same as system 200 in some embodiments. The exemplary process control system 300 may similarly include a UI layer 310 having UI blocks 312, a module layer 320 having control modules 322, a signal layer 330 having signal objects 332, and a device layer 340 having field devices 342. Each of the UI blocks 312, control modules 322, signal objects 332, and field devices 342 may be UI blocks 212, control modules 222, signal objects 232, and field devices 242, respectively, as described above. In addition, the module layer 320 may include a control module library 324, and the signal layer 330 may include a signal object library 334. These libraries may store classes of control modules 322 or signal objects 332 that may be implemented within the process control system 300. In further embodiments, additional, fewer, or alternative components, configurations, or connections may instead be used.

In addition to connections as illustrated in FIG. 2, the block diagram in FIG. 3 illustrates internal connections of the UI blocks 312, control modules 322, signal objects 332, and field devices 342. In the exemplary embodiment illustrated, each UI block 312 has variables 316 and corresponding paths 318. The variables 316 may provide a name or means of obtaining information connected to the corresponding path in the UI block 312, such as a configurable variable name to identify the data when called or requested by another block, application, or program. In some embodiments, the variables 316 may store (in volatile or permanent memory) values that may be provided to another block, application, or program. In embodiments in which the variables 316 store data, they may store the most recently received data until new data is received. Thus, the variables 316 may provide the most recently received data to control modules 322 or other blocks, applications, or programs over multiple process control cycles (or other relevant update periods) until new data is available. For example, the variable 316A3 of UI block 312A may store the most recently received value from output 328A1 of control module 322A. This stored process control data may, for example, be displayed to the process plant operator or stored in the database 140. If a user or program requests information from variable 316A3, the stored value may be provided. If no data is stored in the variables 316, the request for information from 316A3 may instead cause the request to be routed to output 328A1 of control module 322A by following the corresponding path 318A3.

Similarly, the variables 316 may be used to cause a change in a controllable parameter of the process plant 10. For example, the variable 316B1 may receive input data from the process plant operator or another source, which may be communicated via corresponding path 318B1 to input 326C1 of control module 326C. The input data may override other input data received by input 326C1 of control module 326C, or, in some embodiments, the input data may be the only source of data to an input of a control module 322. In some embodiments, a UI block 312 may likewise provide process control data directly to a signal object 332, instead of providing the process control data to a control module 322. The signal object 332 may provide the process control data to a field device 342 (e.g., to enable emergency shutdown control through the UI layer 310). The signal object 332 may additionally or alternatively provide the received process control data to a control module 322 (e.g., to indirectly control the field devices 342 through the operation of the control modules 322). Additionally, the UI blocks 312 may be communicatively connected to the control modules 322 in such manner as to allow a UI block 312 to adjust the operation or configuration of a control module 322 via a path 318 when a variable 316 is adjusted. For example, a process plant operator may set a value for a variable 316 of a UI block 312, which may be transmitted to a control module 322 via the path 318 corresponding to the variable in order to adjust a gain in the control module 322. In some embodiments, the UI blocks 312 may receive and provide process control data (e.g., a set point) to the control modules 322 only through the signal objects 332. In some such embodiments, the UI blocks 312 may nonetheless directly adjust or configure the control modules 322 directly (i.e., without using the signal objects 332). Although two UI blocks 312A (having variables 316A1, 316A2, and 316A3 corresponding to paths 318A1, 318A2, and 318A3) and 312B (having variables 316B1 and 316B2 corresponding to paths 318B1 and 318B2) are illustrated, other configurations have more or fewer UI blocks 312 with different numbers of variables 316 and corresponding paths 318 may be used in various embodiments.

Figure 4:
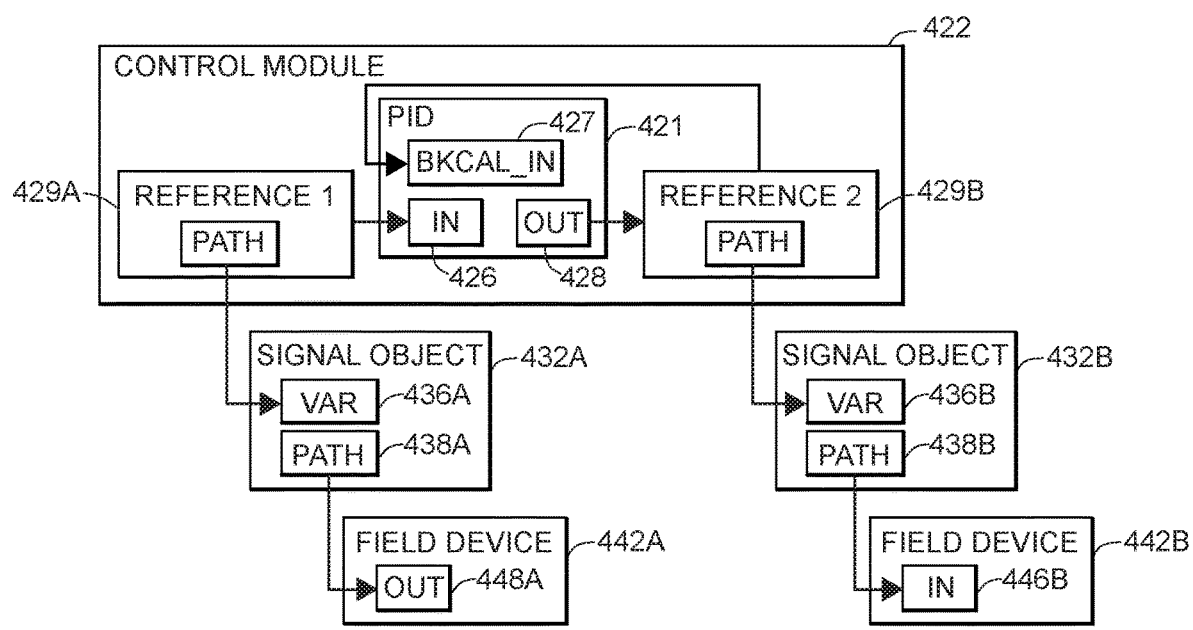
FIG. 4 is a block diagram further illustrating an exemplary control module within the exemplary process control systems of the process control network, in accordance with the description herein.

Also in the exemplary embodiment illustrated, the control modules 322 may have inputs 326 and outputs 328. The inputs 326 receive process control data from the signal objects 332, UI blocks 312, or other sources (e.g., database 140 or expert system 104). The control modules 322 use the input process control data from the inputs 326 to generate output process control data at the outputs 328. The output process control data may be provided to the process plant operator or other user via the UI blocks 312, which may cause the output process control data to be displayed or stored. The output process control data may additionally or alternatively be provided to the field devices 342 via the signal objects 332, which may control the operation of the field device 342. For example, a control module 322 may implement a PID controller receiving measurements from a field device 342 (via a signal object 332) as input process control data at an input 326 to generate output process control data at an output 328 as control commands to operate another field device 342 (via another signal object 332) to control a portion of the process plant 10. Such an exemplary PID control module 322 is illustrated in FIG. 4, discussed below.

Additionally, the control modules 322 may be interconnected, such that an input 326 of a first control module 322 may receive process control data from an output 328 of a second process control module 322. Such an arrangement is illustrated in the connection of input 326A2 of control module 322A to receive output process control data from output 328B1 of control module 322B. Although input 326A2 is illustrated as being directly connected to output 328B1, some embodiments may use signal objects 332 to connect the inputs 326 and outputs 328 of multiple control modules 328. In such embodiments, each output 328 is associated with a signal object 332 to provide output process control data to the signal object 332. An input 326 of the same or another control module 322 may then be connected to the signal object 332 to receive the process control data. Thus, in such embodiments, each input 326 and each output 328 are associated with (i.e., connected to) only one of the signal objects 332. Because multiple control modules 322 or UI block 312 may use the same process control data, however, multiple inputs 326 or paths 318 may be associated with the variable 336 of a signal object 332 at the same time. In further embodiments, multiple outputs 328 of control blocks 322 or paths 318 of UI blocks 312 may be associated with the same variable 336 of the signal object 332. For example, the output 328 of a control module 322 may ordinarily provide process control data to a variable 336 of a signal object 332, but the process plant operator may override the module-generated process control data using a UI block 312, where the UI block 312 provides process control data to the variable 336 of the same signal object 332. Although three control modules 322A (having inputs 326A1, 326A2, and 326A3 and outputs 328A1 and 328A2), 322B (having inputs 326B1 and 326B2 and output 328B), and 322C (having inputs 326C1 and 326C2 and outputs 328C1 and 328C2) are illustrated, other configurations have more or fewer control modules 322 with different numbers of inputs 326 and outputs 238 may be used in various embodiments.

Further in the exemplary embodiment illustrated, each signal object 332 has a variable 336 and a path 338. The variables 336 and paths 338 of the signal objects 332 function in a manner similar to the variables 316 and paths 318 of the UI blocks 312. To connect the control modules 322 to the signal objects 332, inputs 326 or outputs 328 of the control modules 322 may be associated with the signal objects 332. Such associations may be effected by setting a reference or pointer for an input 326 of a control module 322 to indicate or call the variable 336 of a signal object. In a preferred embodiment, each signal object has only one variable 336 and a corresponding path 338. The variable 336 may be either defined to have a pre-specified type and/or scale (e.g., long integer, floating point, text string, milliamps, volts, psi, etc.) or undefined to represent any type of process control data. In some embodiments, the variable 336 may include both process control data and data structure information regarding the format and scale of the variable. Further embodiments may similarly permit the control module 322 to configure the variable to store data in a particular manner. For example, the data type and scale of the variable 336 may be set when the signal object 332 is associated with an input 326 or output 328. In preferred embodiments, the variable 336 of a signal object 332 is set to a standard format, regardless of protocols, types, or formats of the process control data received from or sent to the field device 342 that is connected to the signal object 332. Thus, the signal object 332 may extract process control data received from the field device 342 via the I/O architecture and convert the process control data into the standard format for further use by one or more control modules 322. The signal object 332 may likewise convert process control data received in the standard format from the one or more control modules 322 into a format suited for transmission via the relevant I/O infrastructure to the field device 342.

Each signal object 332 also includes a path 338 corresponding to the variable 336. The path 338 specifies the data source for the variable 336 or the target to which data received at variable 336 is sent. Typically, the path 338 indicates either a field device 342 or constant data, but the path 338 may indicate other types of data source or data recipients. For example, paths 338 may indicate databases 140, inputs 326 or outputs 328 of control modules 322, or other locations within the process control network 100. When the path 338 indicates a field device 342, it may indicate a path through the relevant I/O architecture to an input 346 or output 348 of the field device 342, which may be separate channels or ports of the field device 342. The path 338 may, therefore, include information regarding communication protocols or formats for a portion of the I/O infrastructure of the process plant 10 relevant to the field device 342. In some embodiments, the path 338 may pick one or more bits from a data stream including multiple bits generated by the field device 342, which may facilitate obtaining process control data of particular relevance from a digital signal received from the field device 342. When the path 338 indicates constant data, the constant data may be directly stored in the path 338 or the path may point to a memory storage location containing the constant data, which may be a local or remote location. The constant data may be process control data or other relevant data, such as a gain or limit.

Signal objects 332 may be associated with control modules 322 without having a specified path 338. During initial or subsequent configuration of the process control system 300, for example, signal objects 332 may be created with undefined paths 338. The undefined paths 338 may later be defined by assigning a value specifying either constant data or a data source, such as a field device 342. Thus, a signal object 332 may be associated with an input 326 or an output 328 of a control module 322 without having a value or data source assigned to the path 338 of the signal object 332. The path 338 may be assigned later, either before or during operation of the process plant 10. For example, the path 338 may be assigned by the process plant operator during operation of the process plant 10 when the information is needed (or shortly before it is anticipated that the information will be needed). In such instances, a UI block 312 may prompt the process plant operator to assign the path 338 to the signal object 332 via the UI device 112. In some embodiments, this may include presenting the process plant operator with one or more options from which to select the path 338 to assign to the signal object 332. For example, a list of all field devices 342 identified as connected to the controller 11 may be presented via the UI device 112 to allow the selection of a path 338 to assign to the signal object 332. This may involve the controller 11 polling the field devices 342 to identify the field devices 342 communicatively connected to the controller 11, or it may involve querying a database 140 to obtain configuration information regarding connected field devices 342 and the local I/O architecture.

Additionally, new paths 338 may be assigned to signal objects 332, thereby replacing existing paths 338. This may occur when a data source changes, such as when a field device 342 is replaced with another field device 342 or when the local I/O architecture changes. Reassigning paths 338 also facilitates more efficient testing of operation of the process control system 300. In some embodiments, the paths 338 of the signal objects 332 may be assigned to test data. The test data may mimic process control data expected from field devices 342 under a variety of operating conditions of the process plant 10. The process control system 300 may thereby be tested prior to installation within the process plant 10. Such testing may be performed without regard to the I/O architecture or specific types, protocols, formats, or other information regarding the field devices 342 by using paths 338 specifying the test data. The test data does not need to be specific to any particular field devices 342 or I/O architecture of a process plant 10, so the process control system 300 may be tested without knowledge of the configuration of the process plan 10. This is highly desirable because the particular configuration of the process plant 10 (i.e., the types, numbers, and I/O architecture of the field devices 342) is often not finalized until shortly before the process plan 10 is constructed, and the configuration may change repeatedly over the life of the process plant 10. The signal objects 332 separate the control modules 322 from the field devices 342, so that the system 300 does not need to be tested for the specific field devices 342. Instead, each signal object 332 may be adjusted as necessary (e.g., between testing and installation in the process plant 10, when a field device 342 is replaced, etc.). Adjusting the signal object 332 does not require retesting the entire process control system 300 because only the affected signal object 332 changes. In some embodiments, this change may only involve assigning a new path 338 to the signal object 332 to specify a new data source or data recipient (e.g., an output 348 or input 346 of a new field device 342). In other embodiments, other parameters relating to processing process control data within the signal object may also be adjusted, such as parameters indicating a communication protocol or output scale. In some embodiments, the signal object 332 may receive information regarding such parameters directly from the field device 332, such as by receiving device description language (DDL) data stored in the field device 342. Of course, signal object 332 may also be updated by replacement, wherein an old signal object 332 is disassociated from a control module 322 and a new signal object 332 is associated with the control module 322.

Some signal objects 332 may further include configurable alarms 335. The alarms 335 may be directly communicatively connected to the UI blocks 312, instead of being connected through the control modules 322. Thus, an alarm 335 of a signal object 332 may send data directly to a UI block 312 without sending the data to any control modules 322. This avoids using control modules 322 solely for the purpose of determining alarm states, so all the control modules 322 implement some process control loop or other process control action. The alarms 335 may be configured during configuration and set-up of the process control system 300 or may be set or adjusted by the process plant operator to determine an abnormal operating condition within the process plant 10 based upon process control data received at the signal object from a field device 342 specified by the path 338. When one or more criteria of the alarm 335 are met, the alarm 335 may be triggered, which may further cause an alert or warning to be presented to the process plant operator or other user of the process control system 300 via the UI device 112. Although eight signal objects 332A (having variable 336A, path 338A, and alarm 335A), 332B (having variable 336B and path 338B), 332C (having variable 336C and path 338C), 332D (having variable 336D and path 338D), 332E (having variable 336A, path 338A, and alarm 335A), 332F (having variable 336F and path 338F), 332G (having variable 336G and path 338G), and 332H (having variable 336H and path 338H) are illustrated, other configurations have more or fewer signal objects 332 (with or without alarms 335) may be used in various embodiments.

The control module library 324 and the signal layer library 334 may store a plurality of classes of control modules 322 and signal objects 332, respectively. The classes may be general types of control modules or signal objects defining their data structure and use in an object-oriented programming language. The control module classes stored in the control module library 324 may be reusable classes that may be configured to perform process control functions within the process control system 300. When each control module 322 is created from a control module class, the control module 322 may be instantiated as an instance of the class, with or without further configuration. For example, a particular PID control module 322 may be created as an instance of a control module class for PID controllers stored in the control module library 324. The instantiated control module 322 may be configured to perform process control functions, as discussed elsewhere herein, either at the time of instantiation or at a later time. Similarly, the signal object classes stored in the signal object library 334 may be general types of signal objects that may be used within the process control system 300, and signal objects 334 may be created as instances of the signal object classes. In some embodiments, all signal objects 332 may be instances of one signal object class. In some embodiments, updating or adjusting a control module class in the control module library 324 or a signal object class in the signal object library 334 may automatically apply the updates or adjustments to every control module 322 or signal object based upon the class. In some embodiments, the control module library 324 and the signal layer library 334 may be combined into one library, which may be stored locally in the memory 32 of the controller 11 or remotely in the database 140 or elsewhere.

The field devices 342 within the process control system 300 may have inputs 346 and outputs 348. The inputs 346 may receive process control data or control commands via the signal objects 332 that cause the field devices to implement a physical control operation, such as opening or closing a valve, starting or stopping a motor, or controlling a pump. The outputs 348 may transmit process control data generated by the field devices, such as temperature, pressure, or flow measurements. Each field device 342 may include one or more inputs 346 or outputs 348. Although two field devices 342A and 342B, with one input 346A and one output 348A and with one input 346B and two outputs 348B1 and 348B2, are illustrated, other configurations may instead be implemented in various embodiments.

FIG. 4 illustrates a block diagram of an exemplary control module to further illustrate operation of the process control system 300 of the process control network 100, showing operation of a PID control module according to embodiments of the invention disclosed herein. The control module 422 or similar control modules may be included as control modules 222 or 232 in the exemplary process control systems 200 and 300 discussed above. The control module 422 shown in FIG. 4 illustrates in greater detail the workings of a particular type of control module, but other configurations may instead be used in various control modules within the process control network 100. As above, the signal objects 432 may be implemented as described elsewhere herein, particularly with respect to signal objects 232 and 332, and the field devices 442 may be any type of field devices described herein, particularly as discussed with respect to field devices 242 and 342. Although two field devices 442A and 442B are illustrated in the exemplary embodiment of FIG. 2, the field devices 442A and 442B may be combined in some embodiments.

The exemplary control module 422 includes a control logic block 421, which performs the control logic operations of the control module 422. The control logic block 421 may be configured during set-up of the process control systems 200 or 300, or the configuration of the control logic block 421 may be determined by the configuration of a class of control modules to which it belongs. For example, the weights assigned to each of the proportional, integral, and derivative terms within the PID control logic block 421 may be specified for all instances of a class of PID control modules or may be configured from a general PID control module to be suited for a particular use within the process control network 100. In some embodiments, the control logic block 421 may be configured (either directly or as an instance of a class) by the expert system 104 based upon automated analysis and optimization of the operation of the process plant 10. To perform process control logic operations, the control logic block 421 receives an indirect input 426 and a direct input 427. The indirect input 426 receives input process control data indirectly from the field device 442A regarding the state of a measurable condition within the process plant 10. In some embodiments, the input process control data may be obtained via a reference 429A within the control module 422, which specifies a path to the signal object 432A. Such arrangements allow the control logic block 421 to remain independent and consistent across multiple instances of a class, with the information regarding the associated signal objects 432 contained in the references 429. The direct input 427 directly receives output process control data from the output 428 of the control logic block 421 via another reference 429B within the control module 422. This input process control data received at the indirect input 426 may be compared against the output process control data received at the direct input 427 to determine error terms and generate further output process control data to control the field device 442B using well-known techniques.

To connect the field devices 442A and 442B to the control module 422, signal objects 432A and 432B are used. The signal objects 432 each include a variable 436 and a path 438, as discussed in further detail elsewhere herein. The reference 429A specifies a path or pointer to variable 436A of signal object 432A, which has a corresponding path 438A specifying the output 448A of field device 442A. Thus, the process control data generated by the field device 442A at output 448A is received by signal object 432A (where it may be stored in variable 436A), from which reference 429A of the control module 422 receives the process control data and provides it to the input 426 of the control logic block 421. The control logic block 421 uses the direct and indirect process control data to generate additional process control data to control the field device 446B to effect process control within the process plant 10. The process control data generated at the control logic block 421 is provided to reference 429B, which provides the process control data to both the direct input 427 and the variable 436B of the signal object 432B. The signal object 432B receives the process control data at variable 436B and provides the process control data to input 446B of field device 442B using the path 438B corresponding to the variable 436B. As discussed elsewhere herein, the signal objects may extract or convert portions of the process control data to provide process control data in appropriate formats and using appropriate protocols for the control module 422 and the field devices 442.

Figure 5:
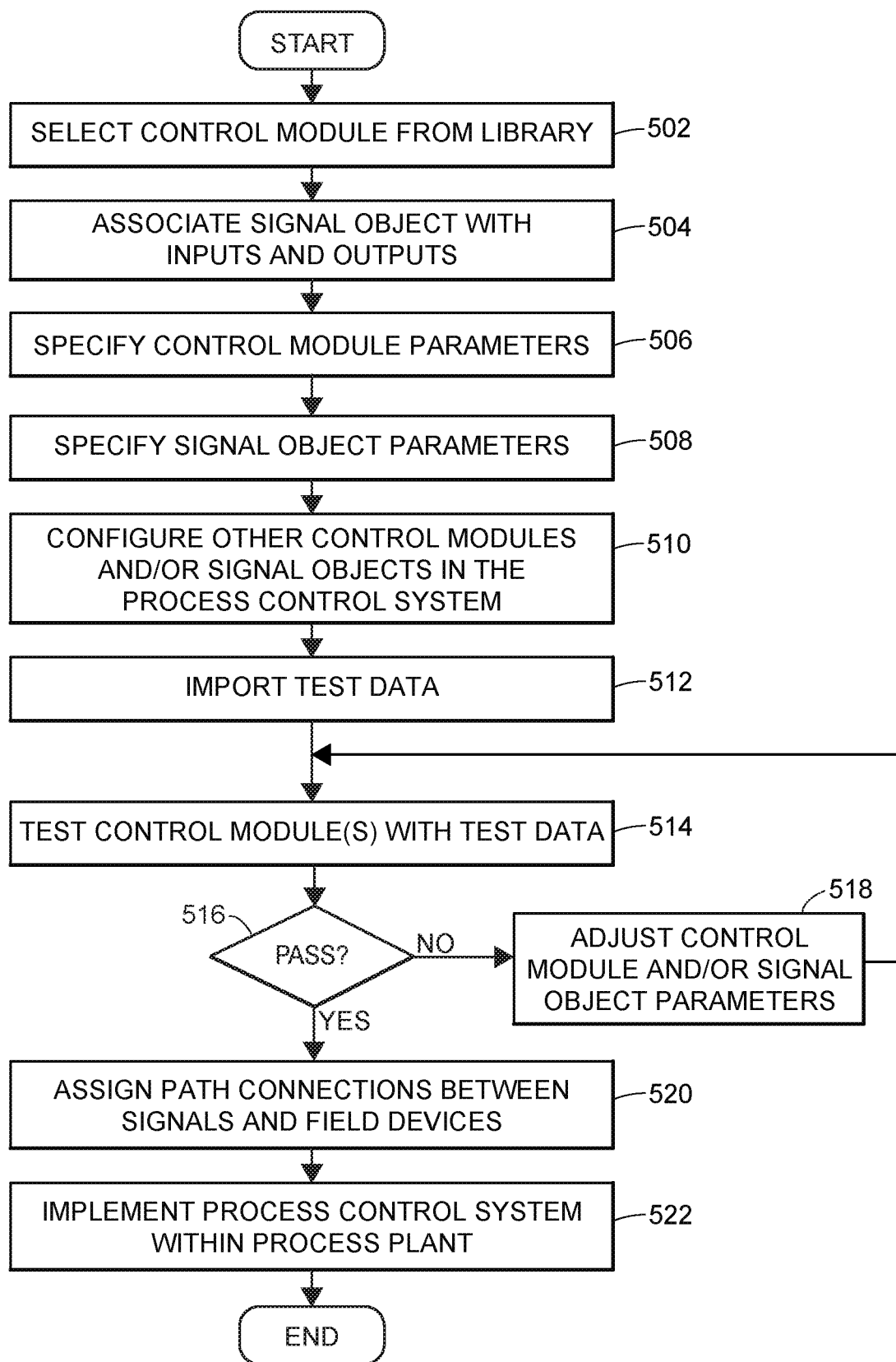
FIG. 5 is a flow chart depicting an exemplary method for configuring the process control systems of the process control network, in accordance with the description herein.

FIG. 5 is a flow diagram of an exemplary process control system configuration and testing method 500, illustrating a method of configuring process control systems of the process control network 100, including systems 200 and 300. References made to process control system 300 are exemplary only, and the method 500 may be applied to other process control systems in various embodiments. The exemplary method 500 may begin with the selection of a control module at block 502. Signal objects may be associated with inputs and outputs of the selected control module at block 504, and parameters of the selected control module and the signal objects may be specified at blocks 506 and 508. Other control modules within the process control system may be similarly configured at block 510 to form a part or all of the process control system. The configured process control system may then be tested at blocks 512-518 prior to implementation in the process plant 10. This may include importing test data at block 512, testing the operation of the control modules of the process control system at block 514, and determining whether the process control system passes the test based upon the output of the process control modules at block 516. When the process control system fails the test, adjustments may be made to the parameters of one or more control modules or signal objects at block 518, and the process control system may be retested at block 514. When the process control system passes the test at block 516, it may be implemented in the process plant by assigning path connected between signal object and field devices at block 520. The process control system may then execute within the process control network 100 to control the operation of the process control plan 10 at block 522.

In some embodiments, blocks 502-518 may be implemented on one or more computers not associated with the process plant 10. Thus, the process control system may be designed, configured, and tested to operate on any number of process plants with different configurations, in a manner independent of the I/O architecture utilized in the process plant 10. Upon verification of proper operation through testing at blocks 512-518, the configured process control system program (having UI blocks 312, control modules 322, and signal objects 332) may be stored in a non-transitory computer readable storage medium (e.g., a non-volatile memory device such as a hard disk drive or an optical disk). Part or all of the stored process control system program may then be downloaded, installed, or instantiated into the controller 11, UI device 112, expert system 104, or other components of the process control network 100 in order to configure and implement the process control system within the process plant at blocks 520-522. Configuring and implementing the process control system within the process plant 10 may include assigning field devices 342 to the paths 338 of the signal objects 332 at block 520.

At block 502, a process control engineer, technician, or other user may select a control module 322 to configure. Selecting the control module 322 may include selecting a class of process control modules from the control module library 324. Selecting the control module 322 may alternatively include creating a new control module 322 by defining the structure, logic, and other characteristics of the control module. In some embodiments, selecting the control module 322 may cause the selected control module to be included in a user interface of the process control system, which may be implemented by one or more UI blocks 312 and presented to a process plant operator via the UI device 112. In some embodiments, the user may choose whether the control module 322 will be included in the user interface of the process control system.

At block 504, one or more signal objects 332 may be associated with one or more inputs 326 or outputs 228 of the selected control module 322. The signal objects 332 may be associated with the control modules 322 automatically or by a process control engineer, technician, or other user. Each signal object 332 may be associated with an input 326 or output 328 as described above, such as by specifying a path to a variable 336 of the signal object 332 in a reference of the control module 322. In some embodiments, signal objects 332 must be associated with all inputs 326 and outputs 328 of the control module 322, while other embodiments may permit inputs 326 or outputs 328 without associated signal objects 332. Some embodiments may facilitate flagging of inputs 326 or outputs 328 of the control module 322 to be disregarded during operation of the process control system. In such embodiments, the process control module 322 may execute without using the flagged inputs 326 or outputs 328 during operation of the process control system. This may avoid warning or error messages to the process plant operator that may otherwise be generated regarding the undefined inputs 326 or outputs 328 of the control module 322 at runtime.

In some embodiments, selecting the control module 322 at block 502 may automatically associate one or more signal objects 332 with inputs 326 or outputs 328 of the control module 322. This may include instantiating or otherwise creating new signal objects 332 for one or more of the inputs 326 or outputs 328. For example, the control module library 324 may include one or more control strategies, and each control strategy may include the control module 322 and one or more signal objects 332 associated with the control module 322. Selecting the control module 322 may, then, be performed by selecting a control strategy that includes the control module 322. In further embodiments, the control strategy includes one or more signal objects 332 but does not include any paths 338 of the signal objects 332. In other embodiments, the control strategy may include signal objects 332 and one or more paths 338 that indicate constant data, but may exclude other paths 338. The control strategies may further include information regarding parameters of the control module 322 or signal objects 332, as discussed further below.

At block 506, one or more parameters of the control module 322 may be specified. The parameters may be specified automatically or by a process control engineer, technician, or other user. The parameters may be associated with the internal operation, communication connections, or presentation of the control module 322. For example, the parameters may specify a name of the control module 322, a protocol used for communication, a rate of control cycle execution, gains or weights to be applied to control logic, or other information affecting the operation or use of the control module 322 within the process control system. In some embodiments, default values for some or all parameters may be applied when the control module 322 is initially selected, part or all of which may be adjustable by the user.

At block 508, one or more parameters may similarly be specified for the one or more signal objects 332. The parameters may include information regarding the variable 336 or path 338, including formats or protocols to be used for communication with the control module 322, UI block 312, or field device 342. For example, the parameters of the signal objects 332 may include specifications of field devices 342 in the paths 338, which may be assigned to actual field devices 342 or to memory locations designed to receive test data. The parameters may further include information regarding alarms, the scale of received process control data, or bit picking from data streams as discussed above.

At block 510, other control modules 322 or signal objects 332 may be created and configured to produce the process control system or a part thereof. This may include connecting multiple control modules 322 to perform complex control functions, as discussed above. For example, one or more additional control modules 322 may be selected and configured to receive as inputs the process control data generated by the process control module 322 at output 328. As discussed above, the control modules 322 may use a standard format that is independent of the I/O architecture associated with the field devices. In some embodiments, one or more of the additional control modules 322 may have inputs 326 associated with the same signal object 332 associated with the output 328 of the control module 322. In further embodiments, the one or more additional control modules 322 may have inputs 326 associated with variables 336 of other signal objects 332, where the other signal objects 332 have corresponding paths 338 specifying the variable 336 of the signal object 332 associated with the output 328 of the control module 322.

Additionally, or alternatively, configuring the other control modules 322 or signal objects 332 may include creating and configuring signal objects 332 not associated with any control modules 322. Such signal objects 332 may be associated with one or more UI blocks 312 or other UI components of the process control system. This direct connection between the signal objects 332 and the UI blocks 312 may be of particular advantage for signal objects 332 configured to provide alarms, to pick bits from data streams, or to present scaled process control data to the process plant operator using the UI device 112. These signal objects 332 that are not associated with any control modules 322 may otherwise be configured as discussed elsewhere herein, including assignment of paths 338 to inputs 346 or outputs 348 of field devices 342.

When the process control system is sufficiently configured at block 510, it may, in some embodiments, be tested to verify proper functioning using test data at blocks 512-518. At block 512, test data may be imported or accessed. The test data may be data designed to mimic process control data (or historical process control data) that has been stored in a database or other memory. The test data may be independent of the I/O architecture of the process plant 10. In some embodiments, the test data may use the standard data format used by the control modules 322, allowing it to be directly passed through the signal objects without conversion. The test data may further include a plurality of sets of test data indicative of different operating conditions that may occur within process plants, including normal operating conditions, abnormal operating conditions, and emergencies or critical conditions.

At block 514, operation of the process control system may be verified using the test data. This may include executing the control modules 322 and/or UI blocks 312 of the process control system within a test environment and providing the test data as sequential process control data values to the signal objects 332. In order to provide the test data to the signal objects 332, the paths 338 of the signal objects may be assigned to variables or memory locations within the test environment to receive the test data. Sets of test data representing one or more operating conditions may be presented to the signal objects 332, and the output process control data generated by the control modules 322 may be recorded for analysis. The recorded process control data may then be verified by comparison against expected or appropriate process control data.

At block 516, the recorded process control data generated by the control modules 322 may be assessed to determine whether the process control system passes the test by generating responses within an acceptable range. This may include comparing the performance of the control modules 322 with predetermined quality parameters using the output process control data. In some embodiments, the output process control data may be used to simulate the operation of virtual field devices, and verification of proper functioning of the process control system may include verification that the virtual field devices remains within an acceptable range for effective operation of the process plant. When the process control system fails the test at block 516, one or more control modules 322 or signal objects 332 may be adjusted at block 518. When the process control system is determined to be ready for implementation in the process plant 10, it may be implemented in the process plant 10 or may be stored for later implementation, as described above.

At block 518, adjustments to the parameters of the control modules 322 or the signal objects 332 may be made in order to improve performance of the process control system. This may include adjusting parameters regarding responses of control modules 322 or correcting erroneously configured connections by changing paths to or from the signal objects 332. In some embodiments, this may include replacing control modules 322 with other control modules 322 to achieve better performance, particularly in instances where the salient features of the control modules 322 are defined for classes of control modules. Signal objects 332 may likewise be either adjusted or replaced by other signal objects 332. When adjustments have been made, the adjusted process control system may be tested again at block 514 to determine whether further adjustment are required. When the performance of the process control system is within the predetermined quality parameters, the process control system may be implemented in the process plant 10 or may be stored for later implementation, as described above.

At block 520, the process control system may be configured to operate within the specific I/O architecture of the process plant 10 by assigning appropriate values to the paths 338 of the signal objects 332. Information regarding the I/O architecture of the process plant 10 may be received and used to assign the paths 338 of the signal objects 332 to specify the field devices 342 within the process plant 10. Assigning the paths 338 may be accomplished by a batch update to the paths 338 of the signal objects 332, either before or after installation of the process control system within the process control network 100. In some embodiments, one or more of the signal objects 332 or paths 338 may remain undefined or unassigned until runtime, such that the signal object 332 or path 338 may be configured by the process plant operator during execution of the process control system to operate the process plant 10. Also at block 520, the process control system may be installed or incorporated into the process control network 100 of the process plant 10 to perform control operations within the process plant 10.

At block 522, the process control system may operate all or a portion of the process plant 10 via the process control network 100. If the process control system includes a control module 322 with an input 336 or output 338 unassociated with a signal object 332, the process plant operator may be prompted to associate a signal object 332 with the input 336 or output 338 during execution of the control module 322. Alternatively, a signal object 332 may automatically be associated with the control module 322 based upon information from the expert system 104, the field devices 342, or other data sources within the process control network 100. Similarly, if the process control system includes a signal object 332 with an unassigned path 338, a path 338 may be automatically or manually assigned to field devices 342 or constant data values during execution of an associated control module 322. In some embodiments, the process control system may be checked for unassociated or unassigned signal objects 332 or paths 338 during start-up, and corrective action may be taken or suggested at that time. In further embodiments, unassociated or unassigned signal objects 332 or paths 338 may only be configured when an associated control module 322 is actually executed. The process control system may then perform control functions to facilitate or effect control of the process plant 10 via the process control network 100 until operation is discontinued.

Shadow Blocks

According to another aspect of the invention disclosed herein, process control may be at least partially decoupled from the I/O architecture of the process plant 10 using shadow blocks. The shadow blocks may execute on the controller 11 to mimic the operation of field devices or function blocks of field devices. The control modules 34 of the controller 11 may communicate process control data directly with the shadow blocks 36, which may further receive and send process control data between the controller and the field devices 15-23, 40-50. Thus, the shadow blocks may manage communication between control modules and field devices to decouple, at least partially, the control modules from the field devices. In some embodiments, the shadow blocks 36 may further decouple the control modules 34 from the I/O architecture by converting process control data between a standard format used by the control modules and formats or protocols used within the specific I/O architecture of the process plant 10. Generic shadow blocks may be automatically configured for the particular process control system using description data received from the field devices. The description data may describe the functioning of the field devices in a text-based standard description language. Thus, the control modules may be associated with generic shadow blocks, which are automatically configured using the description data, thereby reducing set-up time, saving memory, and reducing errors within the process control system.

Figure 6:
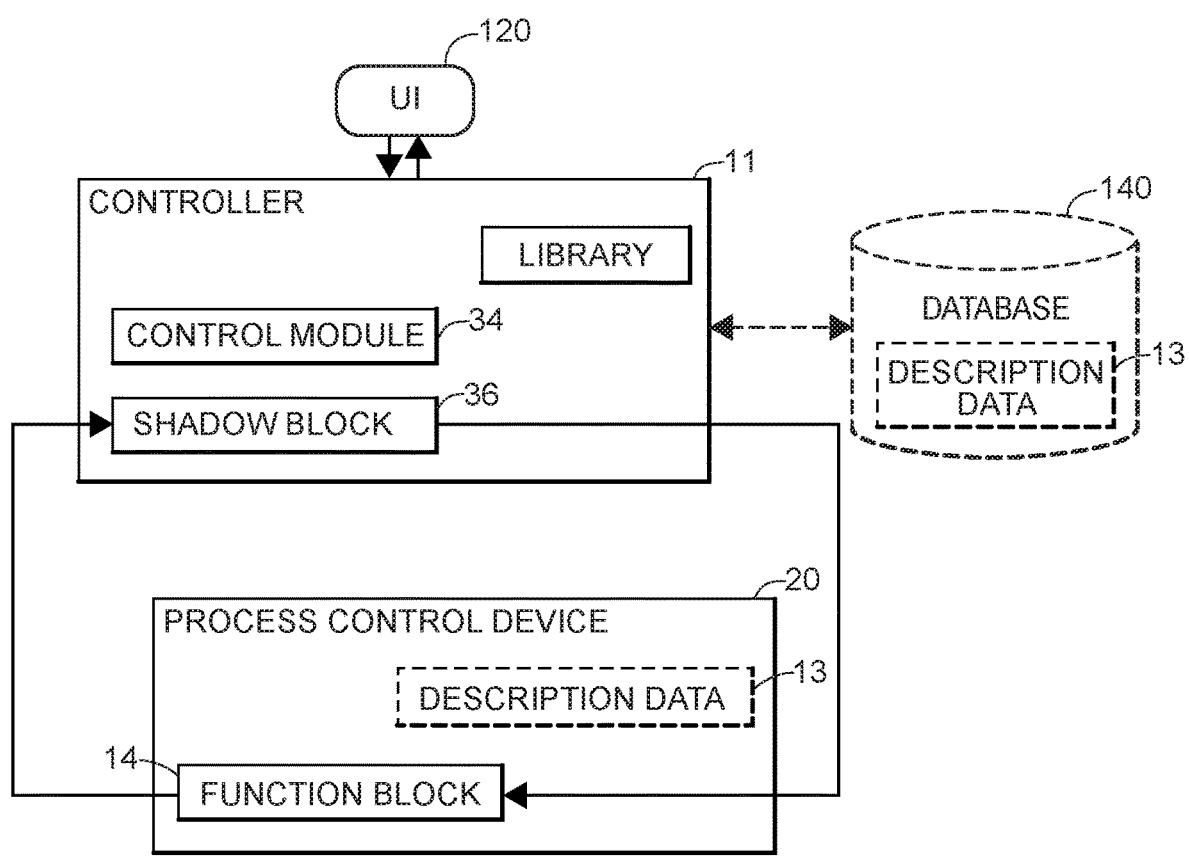
FIG. 6 is a block diagram illustrating an exemplary configuration of a control module using generic shadow blocks within the process control network, in accordance with the description herein.

FIG. 6 is a block diagram illustrating the use of generic shadow blocks in a process plant control system. As in FIGS. 1A-B, the controller 11 is configured to control the operation of a portion or all of a process plant as part of the exemplary process control network 100. The control module 34 receives data regarding the process plant and communicates with a user interface 120 to enable a process plant operator to monitor and control the operation of the process plant via the process control network 100. The user interface 120 may execute within the controller 11 or on another computer, which may include either or both the server 150 or user interface device 112. In order to monitor and control field devices of the process plant 10, the control module 34 interacts with one or more shadow blocks 36 executing within the controller 11. The shadow block 36 simulates or mimics the operation of a function block 14 executing within a field device 20 or control device 24. Shadowing the function block 14 at the controller 11 improves processing efficiency by at least partially separating the I/O architecture and communication configuration from the operation of the control module 34. For further discussion of shadow blocks in process control, see U.S. Pat. No. 6,298,454 (Schleiss, et al., "Diagnostics in a Process Control System"), which is incorporated herein by reference. In the illustrated embodiment, one shadow block 36 is illustrated as mimicking the operation of the function block 14 of field device 20, but additional or alternative arrangements of these components may be utilized in other embodiments.

Shadow blocks must be configured to communicate with field devices and to mimic the specific operation of function blocks. This has previously been accomplished by creating a new type of shadow block for every different type or model of field device, which shadow block is unique to the field device, communication protocol, and I/O architecture for which it was created. If the field device is replaced or the I/O architecture changed, the shadow block must be reconfigured for such changes. Thus, the number of shadow blocks that must be created by a technician or process plant operator may approach or exceed the number of field devices in the process plant, and these must be reconfigured for each change to the process plant components or architecture. To avoid such multiplicity of shadow blocks and constant manual reconfiguration, one aspect of the present invention utilizes a generic shadow block.

The generic shadow block is a general-purpose shadow block that is designed to be automatically configured using description data regarding a field device. In the illustrated embodiment, the shadow block 36 associated with the control module 34 is a generic shadow block when first instantiated or executed. The generic shadow block 36 then receives the description data 13 from the field device 20 or the database 140. The description data 13 is used to configure the generic shadow block 36 to communicate with and mimic the function block 14. The configured shadow block 36 may provide process control data associated with the field device 20 to the control module 34 as an input to the control module 34. Such input process control data is used by the control module 34 to determine the state of a portion of the process plant or to generate output process control data to control the operation of the process plant. Additionally, or alternatively, the configured shadow block 36 may receive process control data as an output from the control module 34. Such output process control data is then communicated to the field device 20 by the shadow block 36.

The description data 13 may describe the operation of the function block 14 in a standard text-based format. The description data 13 may include information identifying type, scale, range, output, device cycles, measurement delays, control delays, or control processes associated with the function block 14. The description data 13 may further include information regarding the display of the field device 20 by the user interface 120. For example, the description data 13 may identify a name or description to display in the user interface 120, as well as parameters associated with the output of the field device 20. In some embodiments, the description data 13 further describes the I/O architecture associated with the field device 20. Such I/O architecture data may include information regarding communication protocols, network connection paths, update cycles, communication delays, or noise levels. As above, the I/O architecture data allows the controller 11 to communicate directly or indirectly with the field device 20 via the process control network 100.

The generic shadow block 36 may receive the description data 13 from the field device 20 or from the database 140.

The field device 20 may store the description data 13 in a memory incorporated within the field device 20, which may be a read-only or re-writable memory. Some field devices 20 may incorporate the description data 13 within one or more function blocks 14 of the field device 20. If the field device 20 includes a processor, a portion of the description data 13 may be generated dynamically using the processor when requested. The generic shadow block 36 may transmit a request to receive the description data 13 to the field device 20, which request may cause the field device 20 to transmit the description data 13 to the generic shadow block 36. Upon receiving the transmitted description data 13, the generic shadow block 36 may be configured within the controller 11 using the processor 30 to mimic the function block 14. Alternatively, the generic shadow block 36 may receive the description data 13 from the database 140. The database 140 may be centrally generated and maintained with information regarding the devices and architecture of the process plant. The description data 13 may be generated or updated using batch processing to create or change multiple entries at once. Again, the shadow block 36 may request the description data 13 from the database 140, which may involve linking an entry in the database 140 to the shadow block 36. When the description data 13 in the database 140 changes, the shadow block 36 may automatically be reconfigured by the link to the database 140.

Regardless of the source of the description data 13, the description data 13 may be provided to the generic shadow block 36 based upon user input. The process plant operator or other user may select the field device 20 from a plurality of field devices in the process control network 100. In some embodiments, the field device 20 is selected from an automatically generated list or group of field devices automatically detected as being communicatively connected to the controller 11. In other embodiments, a control program may be generated in advance and installed on the controller 11, which control program may specify a general control system for the process plant. In such embodiments, the controller 11 may automatically determine each field device to associate with each generic shadow block 36.

In some embodiments, the generic shadow block 36 may be selected from a plurality of generic shadow blocks. Each generic shadow block may be adapted to mimic a class of field device function blocks, such as in-line sensors or electronically controlled valves. Each of the generic shadow block classes may be instantiated and configured to mimic specific field devices or function blocks using description data, as discussed above. Although using multiple classes of generic shadow block increases system complexity, the classes of generic shadow blocks may be few in number relative to the number of non-generic shadow blocks that would be needed for the process control system, so a substantial benefit in storage, configuration, and complexity may nonetheless be achieved through the use of generic shadow block classes. In some embodiments, one or more generic shadow blocks may be stored in a library 12 on the controller 11, from which the generic shadow block 36 may be selected.

Additionally, the control module 34 may be an instance of a class or sub-class of control modules. This may allow the control module 34 to be independent of the I/O architecture or the type of the field device 20. Such classes of control modules may be associated with one or more classes of shadow blocks, such that instantiation of a control module 34 on the controller 11 causes the control module to automatically associate one or more generic shadow blocks 36 of specific classes with the control module 36. Similarly, the controller 11 may automatically determine the number and type of generic shadow blocks to associate with a control module based upon the type or configuration of the control module.

To enable association of generic shadow blocks with various different control modules, a standard communication format may be used between the control modules and the shadow blocks. This standard communication format allows the control module 34 to utilize the shadow blocks 36 regardless of their configuration by the description data 13. After configuration using the description data 13, the configured shadow block 36 may convert process control data between the standard communication format and a communication protocol used by the field device. For example, the shadow block 36 may receive process control data from the field device 20, convert the received data into the standard communication format, and provide the converted data to an input of the control module 34. As another example, the shadow block 36 may receive a control command from the control module 34 in the standard communication format, convert the control command into a communication protocol used by the field device 20, and transmit the converted control command to the field device 20.

Figure 7:
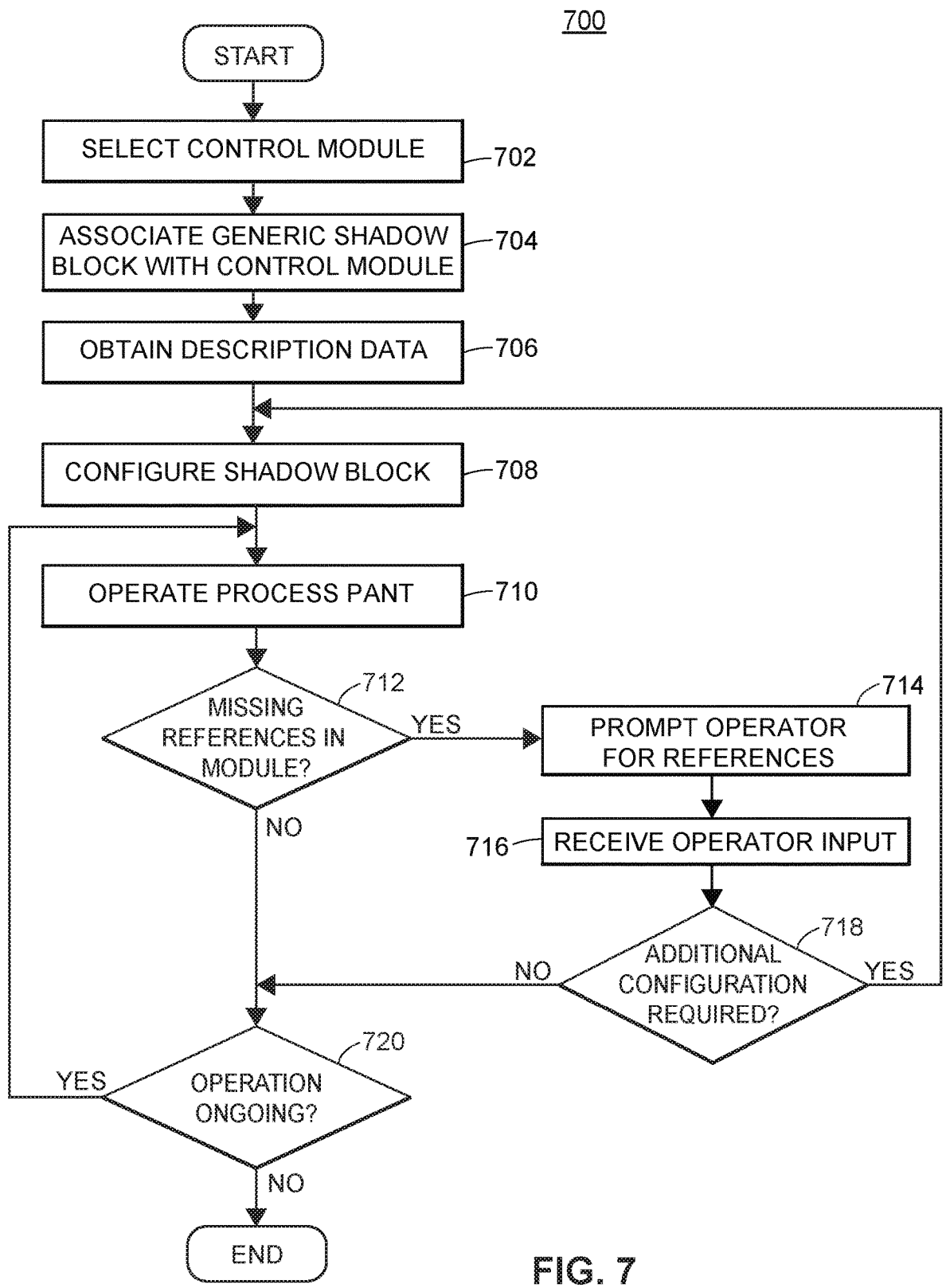
FIG. 7 is a flow chart depicting an exemplary method for instantiating shadow blocks using generic shadow blocks within the process control network, in accordance with the description herein.

FIG. 7 is a flow diagram illustrating the use of generic shadow blocks in process plant control according to an exemplary shadow block instantiation method 700. In addition to the method 700, other methods of using generic shadow blocks may be implemented consistently with the description herein. The method 700 begins at block 702 with the selection of a control module 34 to be executed at the controller 11, and a generic shadow block 36 is associated with the control module 34 at block 704. Description data 13 is obtained at block 706, which is used to configure the generic shadow block 36 at block 708. The configured shadow block 36 and the control module 34 are then executed to operate the process plant at block 710. If any references needed to configure the generic shadow block 36 are determined to be missing at block 712, the process plant operator may be prompted to provide the missing information at block 714. Based upon operator input received at block 716, the controller 11 may determine whether additional configuration of the shadow block 36 is required at block 718. If additional configuration of the shadow block 36 is required, the method 700 may continue at block 708 by configuring the shadow block 36 and operating the process plant at block 710. If no additional configuration of the shadow block 36 is required, the method 700 may continue with operation of the process plant at block 710 until it is determined at block 720 that operation is complete.

At block 702, the method begins with selection of a control module 34. The control module 34 may be selected manually through the user interface 120 or may be loaded on the controller 11 during configuration or start-up of the process control network 100 or the controller 11. For example, a process control engineer or process plant operator may use the user interface 120 to select the control module 34 from a plurality of control modules, which may be stored in the library 12. The control module 34 may be selected or instantiated from a class of control modules. In such embodiments, each instance of a control module of the same class may be displayed as the same standard format to the process plant operator by the user interface 120. Such modules may be differentiated by labels applied by the controller 11 or the user interface 120. In any event, the controller 11 receives an indication of one or more control modules 34 at block 702, which are then connected to field devices 20 via generic shadow blocks 36. In some embodiments, the one or more control modules 34 may be selected by a user during development of the control system, which may be performed at a location separate from the process plant. In such embodiments, information regarding the control modules 34 may be stored and later transferred to the memory 32 of the controller 11.

At block 704, one or more generic shadow blocks 36 are associated with the selected control module 34. This may include specifying a reference to an instance of a generic shadow block 36 for one or more inputs or outputs of the control module 34. The reference may identify the generic shadow block 36 that will receive process control data from an output of the control module 34 or that will provide process control data to an input of the control module 34. This reference may specify a path to the instance of the generic shadow block 36. In some embodiments, the reference may further specify a path to the field device 20 within the process control network 100 or otherwise indicate the field device 20 that the shadow block 36 will shadow. As noted above, some inputs or outputs of control modules 34 may instead reference a constant value or static information via a reference constant 37. Each shadow block 36 may be associated automatically based upon the type or class of the control module 34, or each shadow block 36 may be selected by a user of the process control network 100. Alternatively, each shadow block 36 may be associated automatically based upon information previously generated during development of the control system. For example, multiple modules 34 and references to related generic shadow blocks may be stored in the database 140 and retrieved by the controller 11.

At block 706, description data 13 to configure the one or more generic shadow blocks 36 is received at the controller 11. The description data 13 may be obtained from the field device 20 or the database 140. For example, the generic shadow block 36 may poll the field device 140 with a request for information, which may cause the field device to generate or transmit the description data 13. As another example, a user may select an option via the user interface 120 that causes the shadow block 36 to request and receive the description data 13 from the database 140. The description data 13 may be received in a standardized text-based format that describes the operation of a function block 14 to any generic shadow block 36 in a manner that allows the generic shadow block 36 to shadow the function block 14. Once received, the description data 13 may be used to configure the one or more generic shadow blocks 36. Indeed, the generic shadow blocks 36 may be identical prior to being configured with description data from different field devices, which field devices may differ in type, in types of function blocks within the field devices, or in communication protocol used to communicate with the controller 11.

At block 708, the one or more generic shadow blocks 36 are configured to mimic function blocks 14 of the one or more field devices 20 using the received description data 13. Configuration of the shadow block 36 may include configuring the shadow block 36 to handle communication with the field device 20 via the relevant I/O architecture of the process control network 100, mimic the operation of the function block 14 by providing process control data to the control module 20 or receiving process control data from the control module 20, and translate the process control data between a standard communication format used by the control module 34 and a communication protocol used by the field device 20. This may involve parsing the received text of the description data 13 to extract identifying information, then adjusting parameters of the generic shadow block 36 to include the information extracted from the description data 13. In some embodiments, some portions of the extracted information may be used to look up further information in a database or library, thereby reducing the quantity of description data 13 that must be stored in field devices 20 and transmitted to the controller 11 via process control protocols using the process control communication infrastructure between the field device 20 and the controller 11. For example, a field entry within the description data 13 may indicate a general type of function block by a code, which may be used by the controller 11 to retrieve additional information from the database 140. After configuration at block 708, the configured shadow block 36 functions like other shadow blocks in mimicking the function block 14 and handling communication between the controller 11 and the field device 20 via the relevant I/O architecture.

At block 710, the controller 11 may operate the process plant, or a portion thereof containing the field device 20, using the control module 34. The control module 34 receives process control data from one or more shadow blocks 36 in the standard communication format. Data from the output of the control module 34, from other control modules, or from other sources may also be used as inputs to the control module 34. For example, reference constants 37 may be used as inputs to the control module 34. Process control data output from the control module 34 to the shadow block 36 may be converted into an appropriate communication protocol for the local I/O architecture and transmitted to the field device 20 to control the operation of the process plant. For example, the standard communication formation data from the control module 34 may be converted into Wireless HART® protocol addressed to a valve actuator and transmitted to the valve actuator via a wireless I/O architecture. Upon receiving the process control data, the valve actuator may cause the valve to open or close, based upon the received control commands. Such process control may continue until some cause to change the operation of the process control network 100 occurs.

At block 712, the controller 712 determines whether the control modules 34 and shadow blocks 36 are fully configured, which may include determining whether any references are missing or inoperative. References may be missing from an input or output of the control module 34 when, for example, the I/O architecture of the process plant has changed or the information is not needed for the particular process control network 100. Errors in description data 13 or changes to the configuration may likewise result in missing or broken references. Similarly, references or portions of references identifying field devices may be missing or incorrect, in which case the generic shadow block 36 may be unable to obtain description data 13 associated with the field device 20. When all control modules 34 and shadow blocks 36 are determined to be fully configured at block 712, operation of the control system of the process plant may continue until the controller 11 determines at block 720 that operation of the process plant is no longer ongoing.

When the controller 11 determines that one or more references are missing or incorrect, the process plant operator may be prompted to provide additional information regarding the reference at block 714. Such prompts may be presented to the process plant operator using the user interface 120. The prompt may alert the operator to a missing or broken reference and request information to create or update the reference. In some embodiments, the prompt may include an option to allow the operator to set a flag to ignore certain information. For example, a particular input of the control module 34 may not be needed for proper operation of the process control network 100 due to the system configuration or I/O architecture. In such example, the operator may select the option to set a flag to ignore that input. The flag may be set either at the control module 34 or at the configured shadow block 36, which may still be used for communicating between the field device 20 and other inputs or outputs of the control module 34.

Upon presenting the prompt at block 714, the controller 11 may receive additional information from the process plant operator at block 716. The operator may provide an indication of a field device 20 or a function block 14, from which the shadow block 36 may be configured as discussed above. The operator may alternatively provide a selection of an option to ignore the missing reference. In some embodiments, the controller 11 may receive a selection of one or more function blocks 14 or field devices 20 from a list of those detected in the process control network 100. The received information may also include information relating to the interpretation or use of data received from the field device 20. For example, the operator may specify the units of data output by the function block 14, which information may be used in scaling operations by the control module 34.

Upon receiving the input of the process plant operator at block 716, the controller 11 may determine whether additional configuration of the shadow block 36 is required at block 718. If additional configuration is needed, the method 700 may continue at block 708 by configuring the shadow block 36. If no additional configuration is needed, the controller 11 may further determine whether operation of the process plant is ongoing at block 720. If operation is ongoing, the controller 11 may continue to execute the process control system to operate the process plant at block 710. If operation of the process plant is not ongoing, the method 700 may end.

Additional Considerations

The following additional considerations apply to the foregoing discussion. Throughout this specification, actions described as performed by the server 150, the UI device 112, or any other device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a non-transitory computer readable medium (i.e., on a memory device). The instructions, when executed by one or more processors of a corresponding device (e.g., a server, a mobile device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. As can be appreciated from the foregoing description, the systems, apparatus, and methods described herein may have the benefit or effect of improving the ability of such personnel to configure or operate a process control system. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

Aspects

The following aspects of the disclosure are exemplary only and not intended to limit the scope of the disclosure.

1. A computer-implemented method of operating a process plant, comprising: selecting a control module associated with a control process, wherein the control module has at least one input configured to receive process control data; associating a first signal object with the at least one input of the control module; and assigning a first path to the first signal object, wherein the first path specifies an output of a process control device of the process plant, wherein the control module receives process control data associated with the process control device from the first signal object.

2. The computer-implemented method according to aspect 1, wherein the process control data received from the first signal object is independent of the I/O architecture of the process plant.

3. The computer-implemented method according to either of aspect 1 or aspect 2, wherein the first signal object receives output data from the field device via one or more protocols, extracts the process control data from the received output data, and provides the process control data to the control module in a standard format regardless of the one or more protocols of the received output data.

4. The computer-implemented method according to any one of aspects 1-3, further comprising: associating a second signal object with an output of the control module; and assigning a second path to the second signal object, wherein the second path specifies an input of one of the process control device or another process control device of the process plant, wherein the control module communicates process control data to the process control device or another process control device through the second signal object without regard to the I/O architecture associated with the process control device or another process control device.

5. The computer-implemented method according to aspect 4, further comprising: selecting a second control module, wherein the second control module includes an input; and associating the input of the second control module with the second signal object, wherein associating the input of the second control module with the second signal object causes the second control module to receive the process control data from the output of the first control module at the input of the second control module.

6. The computer-implemented method according to any one of aspects 1-5, further comprising: storing, by a processor of a first computer, in a memory the control module and the associated first signal object prior to assigning the first path to the first signal object; and retrieving, by a processor of a second computer, from the memory the control module and the associated first signal object prior to assigning the first path to the first signal object.

7. The computer-implemented method according to aspect 6, wherein the first path is assigned to the first signal object during execution of the control module in operating the process plant.

8. The computer-implemented method according to any one of aspects 1-7, further comprising: associating a third signal object with at least one input of the control module; and assigning a third path to the third signal object, wherein the third path defines a constant value.

9. The computer-implemented method according to any one of aspects 1-8, wherein the process control device comprises a field device.

10. The computer-implemented method according to any one of aspects 1-9, wherein the control module is an instance of a class in an object oriented programming language.

11. The computer-implemented method according to aspect 10, further comprising updating the class of which the control module is an instance, wherein the updates to the class are automatically applied to the instance of the class.

12. The computer-implemented method according to any one of aspects 1-11, wherein selecting the control module includes receiving a user selection of a control module from a library containing a plurality of control modules.

13. The computer-implemented method according to any one of aspects 1-12, wherein: a plurality of control modules are associated with the first signal object, and assigning the first path to the first signal object causes each of the plurality of control modules associated with the first signal object to receive process control data associated with the process control device from the first signal object.

14. The computer-implemented method according to any one of aspects 1-13, wherein selecting the control module and associating the first signal object with the at least one input of the control module are performed by selecting a control strategy from a library of control strategies, such that the selected control strategy includes both the control module and the associated first signal.

15. The computer-implemented method according to aspect 14, wherein the selected control strategy does not include the first path.

16. The computer-implemented method according to any one of aspects 1-15, further comprising: selecting a fourth signal object to be included directly in a user interface; causing the selected fourth signal object to be included in the user interface; assigning a fourth path to the fourth signal object, wherein the fourth path specifies an output of another process control device of the process plant; and displaying at the user interface an indication of process control data associated with the another process control device received through the fourth signal object.

17. The computer-implemented method according to aspect 16, wherein the fourth signal object is not associated with any control module.

18. The computer-implemented method according to either of aspects 16 or aspect 17, wherein the fourth signal object includes information regarding the scale of the process control data.

19. The computer-implemented method according to any one of aspects 16-18, wherein the fourth signal object includes an alarm based upon the process control data.

20. The computer-implemented method according to aspect 19, further comprising: receiving a selection of one or more alarm criteria from the user; and causing the user interface to present an alarm to the user when the one or more alarm criteria are met.

21. The computer-implemented method according to any one of aspects 16-20, wherein the fourth signal object includes information to pick specific bits from one or more output streams of the process control data for presentation in the user interface.

22. The computer-implemented method according to any one of aspects 1-21, further comprising: assigning a test path to the first signal object, wherein the test path is associated with test data; and executing the control module using the test data to simulate operation of the control module.

23. The computer-implemented method according to aspect 22, wherein the test data includes a plurality of sets of test data indicative of different operating conditions of the process plant, and further comprising: receiving output process control data from the module for each set of test data; recording the received output process control data; and verifying proper functioning of the control module using the recorded output process control data.

24. The computer-implemented method according to aspect 23, further comprising: determining the control module is not functioning within predetermined quality parameters using the recorded output process control data; adjusting one or more parameters of the control module or the first signal object; executing the control module using the test data to simulate operation of the control module following the adjustment of the one or more parameters; receiving output process control data from the module for each set of test data; and recording the received output process control data.

25. The computer-implemented method according to either of aspect 23 or aspect 24, wherein the test data is independent of the I/O architecture of the process plant.

26. The computer-implemented method according to any one of aspects 23-25, further comprising receiving information indicating at least a portion of the I/O architecture of the process plant, wherein the first path is assigned to the first object after proper functioning of the control module is verified and after the information indicating the at least a portion of the I/O architecture of the process plant is received.

27. A process control system for operating a process plant, comprising: a plurality of process control devices disposed within the process plant; and a controller communicatively connected to the plurality of field devices and having at least one control module having an input to receive input process control data and an output to communicate output process control data, wherein the input of the control module is associated with a first signal object to receive process control data, wherein the first signal object has an assigned first path specifying an output of a process control device of the plurality of process control devices, and wherein the control module receives process control data associated with the process control device from the first signal object.

28. The process control system according to aspect 27, wherein the process control data received from the first signal object is independent of the I/O architecture of the process plant.

29. The process control system according to either of aspect 27 or aspect 28, wherein the first signal object receives output data from the field device via one or more protocols, extracts the process control data from the received output data, and provides the process control data to the control module in a standard format regardless of the one or more protocols of the received output data.

30. The process control system according to any one of aspects 27-29, wherein: the output of the control module is associated with a second signal object; the second signal object has an assigned second path specifying an input of a second process control device of the plurality of process control devices; and wherein the control module communicates process control data to the second process control device through the second signal object without regard to the I/O architecture associated with the second process control device.

31. The process control system according to aspect 30, wherein: the second signal object is associated with an input of a second control module of the controller; and the input of the second control module receives process control data from the output of the control module through the second signal object.

32. The process control system according to any one of aspects 27-31, wherein the first path is assigned to the first signal object during execution of the control module by the controller in operating the process plant.

33. The process control system according to any one of aspects 27-32, wherein the control module is an instance of a class of control modules in an object oriented programming language.

34. The process control system according to any one of aspects 27-33, wherein the control module is a member of a class of control modules, such that each member of the class of control modules is automatically updated when the class of control modules is updated 35. The process control system according to any one of aspects 27-34, further comprising a user interface communicatively connected to the plurality of process control devices and to the at least one control module.

36. The process control system according to aspect 35, wherein the user interface is communicatively connected to a third process control device of the plurality of process control devices through a third signal object that is not associated with any control module.

37. The process control system according to aspect 36, wherein the user interface presents process control data received from the third signal object to a user of the user interface.

38. The process control system according to either of aspect 36 or aspect 37, wherein the third signal object provides process control data to the user interface in a standard format without regard to the I/O architecture associated with the third process control device.

39. The process control system according to any one of aspects 36-38, wherein the third signal object provides information to the user interface regarding one or more of the following: the scale of the process control data; an alarm associated with the process control data; or specific bits picked from one or more output streams of the third process control device.

40. A computer-implemented method of operating a process plant, comprising: receiving, at a processor of a controller communicatively connected to a plurality of field devices, an indication of a control module for operating the process plant; associating a generic shadow block within the controller with the control module; receiving, at the controller, description data regarding a field device communicatively connected to the controller, wherein the description data describes a function block of the field device; and configuring the generic shadow block to mimic within the controller the operation of the function block of the field device based upon the received description data.

41. The computer-implemented method according to aspect 40, wherein associating the generic shadow block with the control module includes specifying a reference of an input or an output of the control module to identify the generic shadow block.

42. The computer-implemented method according to aspect 41, wherein the reference specifies a path to the field device.

43. The computer-implemented method according to either of aspect 41 or aspect 42, further comprising specifying a second reference of another input or output of the control module to identify a constant value.

44. The computer-implemented method according to any one of aspects 40-43, further comprising: associating an additional generic shadow block within the controller with the control module; receiving, at the controller, additional description data regarding an additional field device communicatively connected to the controller, wherein the additional description data describes a function block of the additional field device, wherein the additional generic shadow block is identical to the shadow block prior to configuration; configuring the additional generic shadow block to mimic within the controller the operation of the function block of the additional field device based upon the received additional description data.

45. The computer-implemented method according to aspect 44, wherein the function block of the additional field device differs in type from the function block of the field device.

46. The computer-implemented method according to either of aspect 44 or aspect 45, wherein the additional field device differs in type from the field device.

47. The computer-implemented method according to any one of aspects 44-46, wherein the additional field device uses a different communication protocol than the field device.

48. The computer-implemented method according to any one of aspects 40-47, wherein the description data includes data describing the field device in a text-based standard description language.

49. The computer-implemented method according to any one of aspects 40-48, wherein receiving the description data regarding the field device comprises: transmitting a request for the description data to the field device; and receiving the description data from the field device.

50. The computer-implemented method according to any one of aspects 40-49, wherein receiving the description data regarding the field device comprises receiving the description data from a database containing information regarding the process plant.

51. The computer-implemented method according to any one of aspects 40-50, further comprising: determining, upon execution of the control module, whether the generic shadow block has been configured; and if the generic shadow block has not been configured, receiving an indication of the field device; wherein receiving the description data regarding the field device is based upon the received indication of the field device.

52. The computer-implemented method according to any one of aspects 40-51, wherein the indication of the field device is selected by a process plant operator.

53. The computer-implemented method according to any one of aspects 40-52, wherein the indication of the field device is received from a database containing information regarding the process plant.

54. The computer-implemented method according to any one of aspects 40-53, wherein the description data includes information regarding the I/O architecture associated with the field device.

55. The computer-implemented method according to any one of aspects 40-54, further comprising: receiving, at the configured shadow block, process control data from the field device; converting, at the configured shadow block, the received process control data to a standard format used by the control module, wherein the standard format is independent of the configuration of the generic shadow block based upon the description data; providing, to the control module, the converted process control data to an input of the control module.

56. The computer-implemented method according to any one of aspects 40-55, further comprising: receiving, at the configured shadow block, process control data from an output of the control module, wherein the process control data is output in a standard format that is independent of the field device and the I/O architecture of the process plant; converting, at the configured shadow block, the process control data from the standard format to a second format used by the field device; and communicating, to the field device, the converted process control data.

57. The computer-implemented method according to any one of aspects 40-56, wherein the control module is an instance of a class of control modules that are independent of the type of the field device and the I/O architecture of the process plant.

58. The computer-implemented method according to aspect 57, wherein the control module includes an option to ignore one or more inputs from the generic shadow block.

59. The computer-implemented method according to either of aspect 57 or aspect 58, further comprising: generating, by a user device, a user interface configured to operate the process plant, wherein the user interface includes a representation of the control module; and presenting, at the user station, the user interface to a process plant operator, wherein each control module within the class of control modules is represented by the same standard format.

60. The computer-implemented method according to any one of aspects 57-59, wherein the generic shadow block is an instance of a class of generic shadow blocks.

61. The computer-implemented method according to aspect 60, wherein the generic shadow block is automatically associated with the control module based upon the class of the control module.

62. A process control system for operating a process plant, comprising: a plurality of field devices disposed within the process plant; and a controller communicatively connected to the plurality of field devices and having at least one control module for operating the process plant, wherein the controller further includes computer-readable instructions that cause the controller to: associate a generic shadow block within the controller with the control module; receive description data regarding a field device of the plurality of field devices, wherein the description data describes a function block of the field device; and configure the generic shadow block to mimic within the controller the operation of the function block of the field device based upon the received description data.

63. The process control system according to aspect 62, wherein associating the generic shadow block with the control module includes specifying a reference of an input or an output of the control module to identify the generic shadow block.

64. The process control system according to aspect 63, wherein the reference specifies a path to the field device.

65. The process control system according to any one of aspects 62-64, wherein the computer-readable instructions further cause the controller to: associate an additional generic shadow block within the controller with the control module; receive additional description data regarding an additional field device of the plurality of field devices, wherein the additional description data describes a function block of the additional field device, wherein the additional generic shadow block is identical to the shadow block prior to configuration; configuring the additional generic shadow block to mimic within the controller the operation of the function block of the additional field device based upon the received additional description data.

66. The process control system according to aspect 65, wherein the function block of the additional field device differs in type from the function block of the field device.

67. The process control system according to aspect 66, wherein the additional field device differs in type from the field device.

68. The process control system according to any one of aspects 62-67, wherein the description data includes data describing the field device in a text-based standard description language.

69. The process control system according to any one of aspects 62-68, wherein the description data regarding the field device is received from the field device.

70. The process control system according to any one of aspects 62-69, wherein the description data regarding the field device is received from a database containing information regarding the process plant.

71. The process control system according to any one of aspects 62-70, wherein the computer-readable instructions further cause the controller to: determine, upon execution of the control module, whether the generic shadow block has been configured; and if the generic shadow block has not been configured, receive an indication of the field device, wherein the description data regarding the field device is received based upon the received indication of the field device.

72. The process control system according to aspect 71, wherein the indication of the field device is selected by a process plant operator.

73. The process control system according to either of aspect 71 or aspect 72, wherein the indication of the field device is received from a database containing information regarding the process plant.

74. The process control system according to any one of aspects 62-73, wherein the description data includes information regarding the I/O architecture associated with the field device.

75. The process control system according to any one of aspects 62-74, wherein the computer-readable instructions further cause the controller to: receive, at the configured shadow block, process control data from the field device; convert, at the configured shadow block, the received process control data to a standard format used by the control module, wherein the standard format is independent of the configuration of the generic shadow block based upon the description data; provide the converted process control data to an input of the control module.

76. The process control system according to any one of aspects 62-75, wherein the control module is an instance of a class of control modules that are independent of the type of the field device and the I/O architecture of the process plant.

77. The process control system according to aspect 76, wherein the generic shadow block is automatically associated with the control module based upon the class of the control module.

78. The process control system according to any one of aspects 62-77, wherein the generic shadow block is an instance of a class of generic shadow blocks.

79. The process control system according to any one of aspects 62-78, wherein the control module includes an option to ignore one or more inputs from the generic shadow block.

What is claimed is:

1. A computer-implemented method of operating a process plant, comprising:
   selecting a control module associated with a control process, wherein the control module has at least one input configured to receive process control data;
   associating a first signal object with the at least one input of the control module, wherein the first signal object is implemented in a signal object layer between the control module and the process control device and is configured with an input and an output;
   associate a second signal object with an output of the control module, wherein the second signal object is implemented in the signal object layer and is distinct from the first signal object; and
   assigning a first path to the input of the first signal object, wherein the first path specifies an output of a process control device of the process plant,
   wherein the first signal object obtains output data via the first path from the output of the process control device according to an I/O architecture associated with the process control device, extracts process control data representing a subset of data generated by the process control device from the output data, and provides the process control data in a standard format independent of the I/O architecture of the process plant as an output variable of the first signal object via the output of the first signal object,
wherein the second signal object obtains output process control data generated by the control module from the output of the control module at an input variable of the second signal object and provides the output process control data at a second path of the second signal object,
wherein the process control device is further connected to an additional signal object implemented in the signal object layer, which additional signal object is distinct from the first and second signal objects and is configured to obtain and extract an additional subset of data generated by the process control device, which additional subset of data is distinct from the subset of data extracted by the first signal object, and
wherein the control module receives the process control data associated with the process control device from the output of the first signal object.

2. The computer-implemented method of claim 1, wherein the first signal object receives the output data from the process control device via one or more protocols.

3. The computer-implemented method of claim 1, further comprising:
assigning the second path to the second signal object, wherein the second path specifies an input of one of the process control device or another process control device of the process plant,
wherein the control module communicates the output process control data to the process control device or another process control device through the second signal object without regard to the I/O architecture associated with the process control device or another process control device.

4. The computer-implemented method of claim 3, further comprising:
selecting a second control module, wherein the second control module includes an input; and
associating the input of the second control module with the second signal object,
wherein associating the input of the second control module with the second signal object causes the second control module to receive the output process control data from the output of the first control module at the input of the second control module.

5. The computer-implemented method of claim 1, further comprising:
storing, by a processor of a first computer, in a memory the control module and the associated first signal object prior to assigning the first path to the first signal object; and
retrieving, by a processor of a second computer, from the memory the control module and the associated first signal object prior to assigning the first path to the first signal object.

6. The computer-implemented method of claim 5, wherein the first path is assigned to the first signal object during execution of the control module in operating the process plant.

7. The computer-implemented method of claim 1, further comprising:
associating a third signal object with at least one input of the control module; and
assigning a third path to the third signal object, wherein the third path defines a constant value.

8. The computer-implemented method of claim 1, wherein the process control device comprises a field device.

9. The computer-implemented method of claim 1, wherein the control module is an instance of a class in an object oriented programming langue.

10. The computer-implemented method of claim 9, further comprising updating the class of which the control module is an instance, wherein the updates to the class are automatically applied to the instance of the class.

11. The computer-implemented method of claim 1, wherein selecting the control module includes receiving a user selection of a control module from a library containing a plurality of control modules.

12. The computer-implemented method of claim 1, wherein:
a plurality of control modules are associated with the first signal object, and
assigning the first path to the first signal object causes each of the plurality of control modules associated with the first signal object to receive process control data associated with the process control device from the first signal object.

13. The computer-implemented method of claim 1, wherein selecting the control module and associating the first signal object with the at least one input of the control module are performed by selecting a control strategy from a library of control strategies, such that the selected control strategy includes both the control module and the associated first signal.

14. The computer-implemented method of claim 13, wherein the selected control strategy does not include the first path.

15. The computer-implemented method of claim 1, further comprising:
selecting a fourth signal object to be included directly in a user interface;
causing the selected fourth signal object to be included in the user interface;
assigning a fourth path to the fourth signal object, wherein the fourth path specifies an output of another process control device of the process plant; and
displaying at the user interface an indication of process control data associated with the another process control device received through the fourth signal object.

16. The computer-implemented method of claim 15, wherein the fourth signal object is not associated with any control module.

17. The computer-implemented method of claim 15, wherein the fourth signal object includes information regarding the scale of the process control data associated with the another process control device.

18. The computer-implemented method of claim 15, wherein the fourth signal object includes an alarm based upon the process control data associated with the another process control device.

19. The computer-implemented method of claim 18, further comprising:
receiving a selection of one or more alarm criteria from the user; and
causing the user interface to present an alarm to the user when the one or more alarm criteria are met.

20. The computer-implemented method of claim 15, wherein the fourth signal object includes information to pick specific bits from one or more output streams of the process control data associated with the another process control device for presentation in the user interface.

21. The computer-implemented method of claim 1, further comprising:
   assigning a test path to the first signal object, wherein the test path is associated with test data; and
   executing the control module using the test data to simulate operation of the control module.

22. The computer-implemented method of claim 21, wherein the test data includes a plurality of sets of test data indicative of different operating conditions of the process plant, and further comprising:
   receiving the output process control data from the control module for each set of test data;
   recording the received output process control data; and
   verifying proper functioning of the control module using the recorded output process control data.

23. The computer-implemented method of claim 22, further comprising:
   determining the control module is not functioning within predetermined quality parameters using the recorded output process control data;
   adjusting one or more parameters of the control module or the first signal object;
   executing the control module using the test data to simulate operation of the control module following the adjustment of the one or more parameters;
   receiving additional output process control data from the control module for each set of test data; and
   recording the received additional output process control data.

24. The computer-implemented method of claim 22, wherein the test data is independent of the I/O architecture of the process plant.

25. The computer-implemented method of claim 22, further comprising receiving information indicating at least a portion of the I/O architecture of the process plant, wherein the first path is assigned to the first object after proper functioning of the control module is verified and after the information indicating the at least a portion of the I/O architecture of the process plant is received.

26. A process control system for operating a process plant, comprising:
   a plurality of process control devices disposed within the process plant; and
   a controller communicatively connected to the plurality of process control devices and having at least one control module having an input to receive input process control data and an output to communicate output process control data,
   wherein the input of the control module is associated with a first signal object to receive process control data,
   wherein the output of the control module is associated with a second signal object to provide the output process control data,
   wherein the first signal object is implemented in a signal object layer between the control module and the plurality of process control devices and is configured with an input and an output,
   wherein the second signal object is implemented in the signal object layer and is distinct from the first signal object,
   wherein the input of the first signal object has an assigned first path specifying an output of a process control device of the plurality of process control devices,
   wherein the first signal object obtains output data via the first path from the output of the process control device according to an I/O architecture associated with the process control device, extracts process control data representing a subset of data generated by the process control device from the output data, and provides the process control data in a standard format independent of the I/O architecture of the process plant as an output variable of the first signal object via the output of the first signal object,
   wherein the second signal object is configured to obtain the output process control data generated by the control module from the output of the control module at an input variable of the second signal object and to provide the output process control data at a second path of the second signal object,
   wherein the process control device is further connected to an additional signal object implemented in the signal object layer, which additional signal object is distinct from the first and second signal objects and is configured to obtain and extract an additional subset of data generated by the process control device, which additional subset of data is distinct from the subset of data extracted by the first signal object, and
   wherein the control module is configured to receive the process control data associated with the process control device from the output of the first signal object.

27. The process control system of claim 26, wherein the first signal object receives output data from the process control device via one or more protocols.

28. The process control system of claim 26, wherein:
   the second signal object is configure with second path specifying an input of a second process control device of the plurality of process control devices; and
   the control module communicates the output process control data to the second process control device through the second signal object without regard to the I/O architecture associated with the second process control device.

29. The process control system of claim 28, wherein:
   the second signal object is associated with an input of a second control module of the controller; and
   the input of the second control module receives the output process control data from the output of the control module through the second signal object.

30. The process control system of claim 26, wherein the first path is assigned to the first signal object during execution of the control module by the controller in operating the process plant.

31. The process control system of claim 26, wherein the control module is an instance of a class of control modules in an object oriented programming langue.

32. The process control system of claim 26, wherein the control module is a member of a class of control modules, such that each member of the class of control modules is automatically updated when the class of control modules is updated.

33. The process control system of claim 26, further comprising a user interface communicatively connected to the plurality of process control devices and to the at least one control module.

34. The process control system of claim 33, wherein the user interface is communicatively connected to a third process control device of the plurality of process control devices through a third signal object that is not associated with any control module.

35. The process control system of claim 34, wherein the user interface presents process control data received from the third signal object to a user of the user interface.

36. The process control system of claim 34, wherein the third signal object provides process control data to the user interface in a standard format without regard to the I/O architecture associated with the third process control device.

37. The process control system of claim 34, wherein the third signal object provides information to the user interface regarding one or more of the following: the scale of the process control data; an alarm associated with the process control data; or specific bits picked from one or more output streams of the third process control device.

* * * * *